US012349696B2

(12) United States Patent
Jani et al.

(10) Patent No.: US 12,349,696 B2
(45) Date of Patent: Jul. 8, 2025

(54) SYSTEM AND METHOD FOR FORMING AND COOLING CHEWING GUM

(71) Applicant: PERFETTI VAN MELLE BENELUX BV, HK Breda (NL)

(72) Inventors: Bharat Jani, East Brunswick, NJ (US);
Leonard Scarola, Cary, NC (US);
Miles Van Niekerk, Madison, NJ (US);
Krishna Adivi, Summit, NJ (US); Jesse Kiefer, Oxford, NJ (US); Hendrik Eyselee, Glencoe, IL (US)

(73) Assignee: Perfetti Van Melle Benelux B.V., Breda (NL)

( * ) Notice: Subject to any disclaimer, the term of this patent is extended or adjusted under 35 U.S.C. 154(b) by 672 days.

(21) Appl. No.: 17/395,270

(22) Filed: Aug. 5, 2021

(65) Prior Publication Data

US 2021/0360942 A1 Nov. 25, 2021

Related U.S. Application Data

(62) Division of application No. 14/233,829, filed as application No. PCT/US2012/047411 on Jul. 19, 2012, now Pat. No. 11,122,815.
(Continued)

(51) Int. Cl.
*A23G 4/04* (2006.01)
*A23G 3/02* (2006.01)
(Continued)

(52) U.S. Cl.
CPC ............. *A23G 4/04* (2013.01); *A23G 3/0019* (2013.01); *A23G 3/0236* (2013.01); *A23G 4/18* (2013.01); *A23G 7/0093* (2013.01); *A23G 7/02* (2013.01)

(58) Field of Classification Search
None
See application file for complete search history.

(56) References Cited

U.S. PATENT DOCUMENTS

| 168,443 A | 10/1875 | Arend |
| 571,921 A | 11/1896 | Harton |
| (Continued) | | |

FOREIGN PATENT DOCUMENTS

| CA | 1253735 | 5/1989 |
| CA | 2721516 | 12/2009 |
| (Continued) | | |

OTHER PUBLICATIONS

Cervenka CN102046020 English Translation 2011 (Year: 2011).*
(Continued)

*Primary Examiner* — Jacob T Minskey
*Assistant Examiner* — Adrien J Bernard
(74) *Attorney, Agent, or Firm* — Silvia Salvadori, P.C.; Silvia Salvadori

(57) ABSTRACT

Disclosed is a system for forming and cooling gum, the system including a forming system configured to size the gum to include a substantially uniform thickness, a cooling device that is disposed in-line with the forming system and configured to continuously receive the gum from the forming system at an entry point of the cooling device, and a multi-pass conveying system configured to continuously transport the gum from the entry point to an exit point of the cooling device, the forming system and the cooling device being configured to form and cool the gum to be in a condition for stacking or collecting upon exiting the exit point of the cooling device.

11 Claims, 5 Drawing Sheets

Related U.S. Application Data

(60) Provisional application No. 61/510,123, filed on Jul. 21, 2011.

(51) Int. Cl.

| | | |
|---|---|---|
| *A23G 3/34* | | (2006.01) |
| *A23G 4/18* | | (2006.01) |
| *A23G 7/00* | | (2006.01) |
| *A23G 7/02* | | (2006.01) |

(56) References Cited

U.S. PATENT DOCUMENTS

| | | | |
|---|---|---|---|
| 678,043 | A | 7/1901 | Scott |
| 1,006,902 | A | 10/1911 | Bickerton |
| 1,357,665 | A | 11/1920 | Watkins |
| 1,629,461 | A | 5/1927 | Berg |
| 1,684,436 | A | 9/1928 | Dellenbarger |
| 1,771,506 | A | 7/1930 | Mustin |
| 1,829,029 | A | 10/1931 | Zimmerli et al. |
| 1,871,346 | A | 8/1932 | Savy |
| 1,879,897 | A | 9/1932 | Gernelle-Danloy |
| 2,156,810 | A | 5/1939 | Garbutt |
| 2,227,728 | A | 1/1941 | Lombi |
| 2,496,548 | A | 2/1950 | La Rosa et al. |
| 2,507,477 | A | 5/1950 | MacDonald et al. |
| 2,558,899 | A | 7/1951 | Green |
| 2,604,056 | A | 7/1952 | Mahle |
| 2,771,637 | A | 11/1956 | Silvasy et al. |
| 2,941,655 | A | 6/1960 | Wells |
| 3,215,407 | A | 11/1965 | Dye |
| 3,215,536 | A | 11/1965 | Simeone et al. |
| 3,301,454 | A | 1/1967 | Wayne et al. |
| 3,366,992 | A | 2/1968 | Seanor et al. |
| 3,384,498 | A | 5/1968 | Ahrabi |
| 3,455,755 | A | 7/1969 | Phillips |
| 3,464,609 | A | 9/1969 | Murphy |
| 3,492,131 | A | 1/1970 | Schlatter |
| 3,570,417 | A | 3/1971 | Herrmann |
| 3,585,923 | A | 6/1971 | Waller |
| 3,632,358 | A | 1/1972 | Echeandia et al. |
| 3,644,169 | A | 2/1972 | Phillips |
| 3,652,377 | A | 3/1972 | Helmick |
| 3,745,022 | A | 7/1973 | Broeg et al. |
| 3,765,918 | A | 10/1973 | Jordan et al. |
| 3,779,034 | A | 12/1973 | Morgan |
| 3,779,410 | A | 12/1973 | Phillips et al. |
| 3,806,290 | A | 4/1974 | Graff et al. |
| 3,857,963 | A | 12/1974 | Graff et al. |
| 3,866,571 | A | 2/1975 | Austin et al. |
| 3,871,328 | A | 3/1975 | English |
| 3,881,708 | A | 5/1975 | Carle |
| 3,908,032 | A | 9/1975 | Didelot et al. |
| 3,912,817 | A | 10/1975 | Sapsowitz |
| 3,962,463 | A | 6/1976 | Witzel |
| 3,969,513 | A | 7/1976 | Canonne |
| 3,995,064 | A | 11/1976 | Ehrgott et al. |
| 4,032,661 | A | 6/1977 | Rowsell et al. |
| 4,033,709 | A | 7/1977 | Kroyer |
| 4,105,461 | A | 8/1978 | Racciato |
| 4,117,645 | A | 10/1978 | Phillips |
| 4,124,339 | A | 11/1978 | Bernard |
| 4,136,163 | A | 1/1979 | Watson et al. |
| 4,178,459 | A | 12/1979 | Watson et al. |
| 4,187,320 | A | 2/1980 | Koch et al. |
| 4,205,951 | A | 6/1980 | Sollich |
| 4,217,368 | A | 8/1980 | Witzel et al. |
| 4,229,484 | A | 10/1980 | Steels et al. |
| 4,230,688 | A | 10/1980 | Rowsell et al. |
| 4,238,510 | A | 12/1980 | Cherukuri et al. |
| 4,250,196 | A | 2/1981 | Friello |
| 4,266,920 | A | 5/1981 | Hayashi et al. |
| 4,274,535 | A | 6/1981 | Haas, Sr. et al. |
| 4,279,931 | A | 7/1981 | Verwaerde et al. |
| 4,296,255 | A | 10/1981 | Roswell et al. |
| 4,299,825 | A | 11/1981 | Lee |
| 4,352,824 | A | 10/1982 | Puglia et al. |
| 4,352,825 | A | 10/1982 | Cherukuri et al. |
| 4,357,355 | A | 11/1982 | Koch et al. |
| 4,370,350 | A | 1/1983 | Fisher et al. |
| 4,379,169 | A | 4/1983 | Reggio et al. |
| 4,382,962 | A | 5/1983 | Devos et al. |
| 4,388,343 | A | 6/1983 | Voss et al. |
| 4,405,647 | A | 9/1983 | Fisher et al. |
| 4,428,679 | A | 1/1984 | Fischer et al. |
| 4,431,678 | A | 2/1984 | Sollich |
| 4,448,736 | A | 5/1984 | Emery et al. |
| 4,454,834 | A | 6/1984 | Haas, Sr. et al. |
| 4,459,311 | A | 7/1984 | Detora et al. |
| 4,459,425 | A | 7/1984 | Amano et al. |
| 4,466,983 | A | 8/1984 | Cifrese et al. |
| 4,472,437 | A | 9/1984 | Corsello et al. |
| 4,473,299 | A | 9/1984 | Guibert |
| 4,486,983 | A | 12/1984 | Sunnen et al. |
| 4,490,046 | A | 12/1984 | Guibert |
| 4,491,596 | A | 1/1985 | Elias |
| 4,497,846 | A | 2/1985 | Boursier et al. |
| 4,505,375 | A | 3/1985 | Kuster |
| 4,510,271 | A | 4/1985 | Muhle et al. |
| 4,519,844 | A | 5/1985 | Chaux et al. |
| 4,524,086 | A | 6/1985 | Player et al. |
| 4,541,824 | A | 9/1985 | Muller |
| 4,555,407 | A | 11/1985 | Kramer et al. |
| 4,557,938 | A | 12/1985 | Sander et al. |
| 4,562,076 | A | 12/1985 | Arnold et al. |
| 4,579,738 | A | 4/1986 | Cherukuri et al. |
| 4,587,125 | A | 5/1986 | Cherukuri et al. |
| 4,599,002 | A | 7/1986 | Gutknecht |
| 4,607,099 | A | 8/1986 | Kanda et al. |
| 4,612,355 | A | 9/1986 | Belz |
| 4,614,264 | A | 9/1986 | Fishburne |
| 4,614,654 | A | 9/1986 | Ream et al. |
| 4,619,834 | A | 10/1986 | Zanno et al. |
| 4,656,039 | A | 4/1987 | Weiss et al. |
| 4,659,014 | A | 4/1987 | Soth et al. |
| 4,671,961 | A | 6/1987 | Patel et al. |
| 4,692,478 | A | 9/1987 | Mswanathan et al. |
| 4,693,888 | A | 9/1987 | Miyahara et al. |
| 4,711,784 | A | 12/1987 | Yang |
| 4,724,151 | A | 2/1988 | Mansukhani et al. |
| 4,728,515 | A | 3/1988 | Patel et al. |
| 4,747,881 | A | 5/1988 | Shaw et al. |
| 4,753,790 | A | 6/1988 | Silva et al. |
| 4,757,892 | A | 7/1988 | Wenger |
| 4,764,020 | A | 8/1988 | Moriyama |
| 4,792,495 | A | 12/1988 | Taniguchi et al. |
| 4,806,364 | A | 2/1989 | Kubota et al. |
| 4,816,265 | A | 3/1989 | Cherukuri et al. |
| 4,832,962 | A | 5/1989 | Oppenheimer et al. |
| 4,840,491 | A | 6/1989 | Hagiwara et al. |
| 4,850,842 | A | 7/1989 | Van Alstine |
| 4,876,095 | A | 10/1989 | Yang |
| 4,882,172 | A | 11/1989 | Van Alstine |
| 4,882,175 | A | 11/1989 | Ream et al. |
| 4,900,156 | A | 2/1990 | Bauer |
| 4,906,102 | A | 3/1990 | Schwarz et al. |
| 4,911,937 | A | 3/1990 | Crosello et al. |
| 4,915,958 | A | 4/1990 | Fanst et al. |
| 4,929,447 | A | 5/1990 | Yang |
| 4,929,508 | A | 5/1990 | Sharma et al. |
| 4,933,183 | A | 6/1990 | Sharma et al. |
| 4,933,189 | A | 6/1990 | Cherukuri |
| 4,933,190 | A | 6/1990 | Cherukuri et al. |
| 4,935,242 | A | 6/1990 | Sharma et al. |
| 4,938,128 | A | 7/1990 | Knebel |
| 4,940,594 | A | 7/1990 | Van Alstine |
| 4,971,806 | A | 11/1990 | Cherukuri et al. |
| 4,980,177 | A | 12/1990 | Cherukuri et al. |
| 4,980,178 | A | 12/1990 | Cherukuri et al. |
| 4,981,698 | A | 1/1991 | Cherukuri et al. |
| 4,997,659 | A | 3/1991 | Yatka et al. |
| 5,009,893 | A | 4/1991 | Cherukuri et al. |
| 5,009,916 | A | 4/1991 | Colliopoulos |
| 5,045,325 | A | 9/1991 | Lesko et al. |

(56) References Cited

U.S. PATENT DOCUMENTS

| | | |
|---|---|---|
| 5,045,326 A | 9/1991 | Glass et al. |
| 5,085,872 A | 2/1992 | Patel et al. |
| 5,110,607 A | 5/1992 | Yang |
| 5,110,608 A | 5/1992 | Cherukuri et al. |
| 5,125,819 A | 6/1992 | Hager et al. |
| 5,126,151 A | 6/1992 | Bodor et al. |
| 5,128,155 A | 7/1992 | Song et al. |
| 5,135,760 A | 8/1992 | Degady et al. |
| 5,141,128 A | 8/1992 | Pippin |
| 5,158,725 A | 10/1992 | Handa et al. |
| 5,164,210 A | 11/1992 | Campbell et al. |
| 5,170,877 A | 12/1992 | Francioni |
| 5,171,589 A | 12/1992 | Richey et al. |
| 5,192,561 A | 3/1993 | Bunczek et al. |
| 5,192,562 A | 3/1993 | Grey et al. |
| 5,205,106 A | 4/1993 | Zimmermann et al. |
| 5,213,724 A | 5/1993 | Saatkamp |
| 5,217,735 A | 6/1993 | Zibell |
| 5,223,282 A | 6/1993 | Patel et al. |
| 5,227,154 A | 7/1993 | Reynolds |
| 5,229,148 A | 7/1993 | Copper |
| 5,236,720 A | 8/1993 | Cherukuri |
| 5,266,592 A | 11/1993 | Grub et al. |
| 5,283,021 A | 2/1994 | Shih |
| 5,286,502 A | 2/1994 | Meyers |
| 5,300,305 A | 4/1994 | Stapler et al. |
| 5,310,955 A | 5/1994 | Shirtum et al. |
| 5,324,530 A | 6/1994 | Kehoe et al. |
| 5,334,397 A | 8/1994 | Ream et al. |
| 5,344,664 A | 9/1994 | Fitch et al. |
| 5,366,740 A | 11/1994 | Shaw et al. |
| 5,378,131 A | 1/1995 | Greenberg |
| 5,384,144 A | 1/1995 | Bedard et al. |
| 5,397,580 A | 3/1995 | Song et al. |
| 5,405,623 A | 4/1995 | Barkalow et al. |
| 5,407,665 A | 4/1995 | McLaughlin et al. |
| 5,409,715 A | 4/1995 | Meyers |
| 5,419,919 A | 5/1995 | Song et al. |
| 5,425,962 A | 6/1995 | Johnson et al. |
| 5,429,827 A | 7/1995 | Song et al. |
| 5,433,960 A | 7/1995 | Meyers |
| 5,436,013 A | 7/1995 | Synosky et al. |
| 5,437,879 A | 8/1995 | Kabse et al. |
| 5,441,750 A | 8/1995 | Synosky et al. |
| 5,474,787 A | 12/1995 | Grey et al. |
| 5,478,593 A | 12/1995 | Serpelloni et al. |
| 5,486,366 A | 1/1996 | Song et al. |
| 5,494,685 A | 2/1996 | Tyrpin et al. |
| 5,520,457 A | 5/1996 | Gontero et al. |
| 5,523,097 A | 6/1996 | Song et al. |
| 5,534,281 A | 7/1996 | Pappas et al. |
| 5,543,160 A | 8/1996 | Song et al. |
| 5,545,416 A | 8/1996 | Broderick et al. |
| 5,545,424 A | 8/1996 | Nakatsu |
| 5,547,689 A | 8/1996 | Ribadeau-Dumas et al. |
| 5,554,416 A | 9/1996 | Scheufler et al. |
| 5,562,936 A | 10/1996 | Song et al. |
| 5,567,450 A | 10/1996 | Zuromski et al. |
| 5,571,543 A | 11/1996 | Song et al. |
| 5,595,757 A | 1/1997 | Kiefer et al. |
| 5,601,858 A | 2/1997 | Mansukhani et al. |
| 5,611,420 A | 3/1997 | Heim et al. |
| 5,612,071 A | 3/1997 | Song et al. |
| 5,614,234 A | 3/1997 | Song et al. |
| 5,629,042 A | 5/1997 | Serpelloni et al. |
| 5,637,334 A | 6/1997 | Yatka et al. |
| 5,650,232 A | 7/1997 | Glenn et al. |
| 5,665,406 A | 9/1997 | Reed et al. |
| 5,679,389 A | 10/1997 | Wong et al. |
| 5,679,397 A | 10/1997 | Kuroda et al. |
| 5,698,181 A | 12/1997 | Luo |
| 5,714,119 A | 2/1998 | Kawagoe et al. |
| 5,733,583 A | 3/1998 | Muller |
| 5,756,020 A | 5/1998 | Locke et al. |
| 5,756,133 A | 5/1998 | Duggan et al. |
| 5,773,053 A | 6/1998 | Song et al. |
| 5,789,002 A | 8/1998 | Duggan et al. |
| 5,792,494 A | 8/1998 | Kanca et al. |
| 5,792,495 A | 8/1998 | Degady et al. |
| 5,800,847 A | 9/1998 | Song et al. |
| 5,820,821 A | 10/1998 | Kawagoe et al. |
| 5,827,549 A | 10/1998 | Rancich et al. |
| 5,837,302 A | 11/1998 | Degady et al. |
| 5,853,243 A | 12/1998 | Duggan et al. |
| 5,879,728 A | 3/1999 | Graff et al. |
| 5,908,645 A | 6/1999 | Townsend et al. |
| 5,915,524 A | 6/1999 | Horlacher |
| 5,925,387 A | 7/1999 | Gimmler et al. |
| 5,938,826 A | 8/1999 | Baker et al. |
| 5,944,266 A | 8/1999 | Degady et al. |
| 5,955,116 A | 9/1999 | Kehoe et al. |
| 5,955,123 A | 9/1999 | Daggy |
| 5,958,472 A | 9/1999 | Robinson et al. |
| 5,971,739 A | 10/1999 | Hoffman et al. |
| 5,972,392 A | 10/1999 | Kopecky et al. |
| 5,976,581 A | 11/1999 | Song et al. |
| 6,004,589 A | 12/1999 | Song et al. |
| 6,010,723 A | 1/2000 | Song et al. |
| 6,017,565 A | 1/2000 | Rancich et al. |
| 6,017,566 A | 1/2000 | Bunczek et al. |
| 6,030,647 A | 2/2000 | Song et al. |
| 6,045,855 A | 4/2000 | Lindqvist |
| 6,056,429 A | 5/2000 | Duggan et al. |
| 6,074,135 A | 6/2000 | Tapphorn et al. |
| 6,080,432 A | 6/2000 | Tyrpin et al. |
| 6,086,925 A | 7/2000 | Song et al. |
| 6,103,159 A | 8/2000 | Schutze et al. |
| 6,159,509 A | 12/2000 | Johnson et al. |
| 6,168,306 B1 | 1/2001 | Degady et al. |
| 6,190,706 B1 | 2/2001 | Bunczek et al. |
| 6,200,608 B1 | 3/2001 | Gmunder et al. |
| 6,214,389 B1 | 4/2001 | Hoffman et al. |
| 6,221,421 B1 | 4/2001 | Wullschleger et al. |
| 6,235,318 B1 | 5/2001 | Lombardy, Jr. et al. |
| 6,238,710 B1 | 5/2001 | Song et al. |
| 6,254,373 B1 | 7/2001 | Hoffman et al. |
| 6,277,385 B1 | 8/2001 | Luke |
| 6,312,740 B1 | 11/2001 | Roberts |
| 6,314,389 B2 | 11/2001 | Milsom |
| 6,350,480 B1 | 2/2002 | Urnezis et al. |
| 6,375,448 B1 | 4/2002 | Duggan et al. |
| 6,436,326 B1 | 8/2002 | Keillor, III |
| 6,436,461 B1 | 8/2002 | Bouwmeesters et al. |
| 6,436,899 B2 | 8/2002 | Portman |
| 6,440,240 B1 | 8/2002 | Ohman |
| 6,440,472 B1 | 8/2002 | Song et al. |
| 6,444,240 B1 | 9/2002 | Barkalow et al. |
| 6,455,080 B1 | 9/2002 | Wolf et al. |
| 6,458,427 B2 | 10/2002 | Bertellotti et al. |
| 6,468,962 B1 | 10/2002 | Portman |
| 6,471,945 B2 | 10/2002 | Luo et al. |
| 6,479,071 B2 | 11/2002 | Holme et al. |
| 6,485,739 B2 | 11/2002 | Luo et al. |
| 6,551,643 B2 | 4/2003 | Bernatz et al. |
| 6,555,146 B1 | 4/2003 | Rapp et al. |
| 6,558,690 B2 | 5/2003 | Portman |
| 6,558,752 B2 | 5/2003 | Bellemare et al. |
| 6,562,382 B1 | 5/2003 | Corriveau et al. |
| 6,578,232 B2 | 6/2003 | Salice |
| 6,592,884 B2 | 7/2003 | Hofmann et al. |
| 6,601,708 B1 | 8/2003 | Degady et al. |
| 6,620,243 B1 | 9/2003 | Bertellotti et al. |
| 6,627,233 B1 | 9/2003 | Wolf et al. |
| 6,630,182 B1 | 10/2003 | Warrington et al. |
| 6,685,916 B1 | 2/2004 | Holme et al. |
| 6,696,044 B2 | 2/2004 | Luo et al. |
| 6,716,815 B2 | 4/2004 | Portman |
| 6,733,818 B2 | 5/2004 | Luo et al. |
| 6,743,453 B2 | 6/2004 | Warrington et al. |
| 6,759,066 B2 | 7/2004 | Savage et al. |
| 6,773,716 B2 | 8/2004 | Ream et al. |
| 6,773,730 B1 | 8/2004 | Liu et al. |
| 6,776,288 B2 | 8/2004 | Kopecky |
| 6,780,443 B1 | 8/2004 | Nakatsu et al. |

(56) References Cited

U.S. PATENT DOCUMENTS

| | | |
|---|---|---|
| 6,783,783 B2 | 8/2004 | Clark et al. |
| 6,803,061 B1 | 10/2004 | Foster |
| 6,811,797 B1 | 11/2004 | Wolfe et al. |
| 6,838,431 B2 | 1/2005 | Portman |
| 6,846,500 B1 | 1/2005 | Luo et al. |
| 6,858,237 B1 | 2/2005 | Wolfe et al. |
| 6,878,390 B2 | 4/2005 | Murray et al. |
| 6,964,779 B1 | 11/2005 | Hayakawa et al. |
| 6,974,597 B2 | 12/2005 | Ohta et al. |
| 7,022,352 B2 | 4/2006 | Castro et al. |
| 7,030,273 B1 | 4/2006 | Sun |
| 7,087,254 B1 | 8/2006 | Wolfe et al. |
| 7,112,345 B1 | 9/2006 | McHale et al. |
| 7,115,288 B2 | 10/2006 | Witkewitz et al. |
| 7,189,760 B2 | 3/2007 | Erman et al. |
| 7,244,454 B1 | 7/2007 | Zyck et al. |
| 7,438,942 B2 | 10/2008 | Ortiz De Zaratte et al. |
| 7,442,026 B2 | 10/2008 | Shulski et al. |
| 7,537,792 B2 | 5/2009 | Niekerk et al. |
| 7,578,874 B2 | 8/2009 | Benjamin et al. |
| 7,581,872 B2 | 9/2009 | Allen |
| 7,637,999 B2 | 12/2009 | Struschka et al. |
| 7,641,926 B2 | 1/2010 | Kabse et al. |
| 7,732,020 B2 | 6/2010 | King et al. |
| 7,736,681 B2 | 6/2010 | Belzowski et al. |
| 7,786,191 B2 | 8/2010 | De Koning et al. |
| 7,810,446 B2 | 10/2010 | Degady et al. |
| 8,114,211 B2 | 2/2012 | Handrosch et al. |
| 8,226,401 B2 | 7/2012 | Olejarski et al. |
| 9,060,526 B2 | 6/2015 | Jani |
| 2001/0001512 A1 | 5/2001 | Voss |
| 2001/0002274 A1 | 5/2001 | Lessmeister et al. |
| 2002/0028276 A1 | 3/2002 | Rapp et al. |
| 2002/0034592 A1 | 3/2002 | Hogan et al. |
| 2002/0038160 A1 | 3/2002 | Maynard et al. |
| 2002/0058102 A1 | 5/2002 | Makela et al. |
| 2002/0114863 A1 | 8/2002 | Ream et al. |
| 2002/0192330 A1 | 12/2002 | Bunkers et al. |
| 2002/0197388 A1 | 12/2002 | Brown et al. |
| 2003/0044486 A1 | 3/2003 | Wargocki et al. |
| 2003/0072842 A1 | 4/2003 | Johnson et al. |
| 2003/0099741 A1 | 5/2003 | Gubler |
| 2003/0124228 A1 | 7/2003 | Goto et al. |
| 2003/0124234 A1 | 7/2003 | Hayashi et al. |
| 2003/0157213 A1 | 8/2003 | Jenkins |
| 2003/0161914 A1 | 8/2003 | Sault et al. |
| 2003/0185961 A1 | 10/2003 | Sault et al. |
| 2003/0190397 A1 | 10/2003 | Serpelloni |
| 2003/0206993 A1 | 11/2003 | Gubler |
| 2003/0215417 A1 | 11/2003 | Uchiyama et al. |
| 2004/0081713 A1 | 4/2004 | Maxwell et al. |
| 2004/0096544 A1 | 5/2004 | Yatka et al. |
| 2004/0136928 A1 | 7/2004 | Holme et al. |
| 2004/0234648 A1 | 11/2004 | Mazurek et al. |
| 2005/0008732 A1 | 1/2005 | Gebreselassie et al. |
| 2005/0008747 A1 | 1/2005 | Barkalow et al. |
| 2005/0025721 A1 | 2/2005 | Holme et al. |
| 2005/0047267 A1 | 3/2005 | Gneuss et al. |
| 2005/0091873 A1 | 5/2005 | Maryakhin |
| 2005/0112236 A1 | 5/2005 | Boghani et al. |
| 2005/0202118 A1 | 9/2005 | Johnson et al. |
| 2005/0220867 A1 | 10/2005 | Boghani et al. |
| 2005/0265930 A1 | 12/2005 | Erman et al. |
| 2005/0266091 A1 | 12/2005 | Lyons et al. |
| 2006/0019005 A1 | 1/2006 | Talbot |
| 2006/0024425 A1 | 2/2006 | Barkalow et al. |
| 2006/0034975 A1 | 2/2006 | Schechner et al. |
| 2006/0039872 A1 | 2/2006 | Schmidt |
| 2006/0040041 A1* | 2/2006 | Shulski ............... A23G 3/0025 426/660 |
| 2006/0045934 A1 | 3/2006 | Kabse et al. |
| 2006/0057276 A1 | 3/2006 | Carcasona et al. |
| 2006/0078508 A1 | 4/2006 | Gebreselassie et al. |
| 2006/0078509 A1 | 4/2006 | Gebreselassie et al. |
| 2006/0147585 A1 | 7/2006 | Winckelmann et al. |
| 2006/0165833 A1 | 7/2006 | Muschalik et al. |
| 2006/0228451 A1 | 10/2006 | Martin |
| 2006/0280834 A1 | 12/2006 | Jani et al. |
| 2006/0286220 A1 | 12/2006 | King |
| 2006/0292271 A1 | 12/2006 | King |
| 2007/0014889 A1 | 1/2007 | Mchale et al. |
| 2007/0042079 A1 | 2/2007 | Miladinov et al. |
| 2007/0065557 A1 | 3/2007 | Pandey et al. |
| 2007/0076170 A1 | 4/2007 | Lin et al. |
| 2007/0082026 A1 | 4/2007 | Aimutis, Jr. et al. |
| 2007/0141198 A1 | 6/2007 | Yang |
| 2007/0148284 A1 | 6/2007 | Jani et al. |
| 2007/0160707 A1 | 7/2007 | Garcia |
| 2007/0218165 A1 | 9/2007 | Castro et al. |
| 2007/0224311 A1 | 9/2007 | Grey et al. |
| 2007/0231424 A1 | 10/2007 | Castro et al. |
| 2007/0231425 A1 | 10/2007 | Ream et al. |
| 2007/0231426 A1 | 10/2007 | Acar et al. |
| 2007/0269577 A1 | 11/2007 | Pershad et al. |
| 2008/0014302 A1 | 1/2008 | Elejalde et al. |
| 2008/0050605 A1 | 2/2008 | Rapp et al. |
| 2008/0057154 A1 | 3/2008 | Acar |
| 2008/0057155 A1 | 3/2008 | Luo et al. |
| 2008/0063748 A1 | 3/2008 | Massey et al. |
| 2008/0075830 A1 | 3/2008 | Wen et al. |
| 2008/0085354 A1 | 4/2008 | Paeschke et al. |
| 2008/0095899 A1 | 4/2008 | Fornaguera |
| 2008/0107771 A1 | 5/2008 | Fabre et al. |
| 2008/0152756 A1 | 6/2008 | Ream et al. |
| 2008/0159921 A1 | 7/2008 | Mizumoto et al. |
| 2008/0166449 A1 | 7/2008 | Kabse et al. |
| 2008/0166477 A1 | 7/2008 | Rowe et al. |
| 2008/0178802 A1 | 7/2008 | Sakakibara et al. |
| 2008/0199564 A1 | 8/2008 | Boghani et al. |
| 2008/0241319 A1 | 10/2008 | Pandey et al. |
| 2008/0265055 A1 | 10/2008 | Quan et al. |
| 2008/0265056 A1 | 10/2008 | Quan et al. |
| 2009/0029018 A1 | 1/2009 | Elejalde et al. |
| 2009/0053390 A1 | 2/2009 | Sakou et al. |
| 2009/0074924 A1 | 3/2009 | Scudieri et al. |
| 2009/0130251 A1 | 5/2009 | Perry et al. |
| 2009/0135100 A1 | 5/2009 | Kim et al. |
| 2009/0155423 A1 | 6/2009 | Moore et al. |
| 2009/0162475 A1 | 6/2009 | Duggan et al. |
| 2009/0162476 A1 | 6/2009 | Duggan et al. |
| 2009/0214719 A1 | 8/2009 | Gouin et al. |
| 2009/0220656 A1 | 9/2009 | Fabre et al. |
| 2009/0238027 A1 | 9/2009 | Yamaguchi et al. |
| 2009/0327276 A1 | 12/2009 | Thurlow et al. |
| 2010/0055264 A1 | 3/2010 | Liniger et al. |
| 2010/0055280 A1 | 3/2010 | Simon |
| 2010/0062867 A1 | 3/2010 | Chen |
| 2010/0077956 A1 | 4/2010 | Zuehlke et al. |
| 2010/0136185 A1 | 6/2010 | Miladinov et al. |
| 2010/0166934 A1 | 7/2010 | Caiger et al. |
| 2010/0178382 A1 | 7/2010 | Olejarski et al. |
| 2010/0233332 A1 | 9/2010 | Xing et al. |
| 2011/0052756 A1 | 3/2011 | Cervenka et al. |
| 2011/0104330 A1 | 5/2011 | Colle et al. |
| 2011/0178382 A1 | 7/2011 | Topp |
| 2011/0183044 A1 | 7/2011 | Zimmermann et al. |
| 2011/0217427 A1 | 9/2011 | Vaman et al. |
| 2011/0256305 A1 | 10/2011 | Jacques et al. |
| 2012/0207875 A1 | 8/2012 | Aldridge et al. |
| 2012/0207888 A1 | 8/2012 | King |
| 2012/0229325 A1 | 9/2012 | Dutruc |
| 2012/0234942 A1 | 9/2012 | Unosawa et al. |
| 2013/0055907 A1 | 3/2013 | Brandt, Jr. et al. |
| 2013/0209605 A1 | 8/2013 | Adivi et al. |
| 2013/0209606 A1 | 8/2013 | Boudy et al. |
| 2013/0209644 A1 | 8/2013 | Miladinov et al. |
| 2013/0216661 A1 | 8/2013 | Miladinov et al. |
| 2014/0287091 A1 | 9/2014 | Jani et al. |
| 2014/0302195 A1 | 10/2014 | Jani et al. |
| 2014/0302196 A1 | 10/2014 | Jani et al. |
| 2015/0250202 A1 | 9/2015 | Jani |
| 2016/0205965 A1 | 7/2016 | Elejalde et al. |
| 2016/0324183 A1 | 11/2016 | Jani |
| 2016/0330993 A1 | 11/2016 | Grant et al. |

(56) References Cited

U.S. PATENT DOCUMENTS

| | | |
|---|---|---|
| 2017/0059749 A1 | 3/2017 | Wakatsuki |
| 2017/0071226 A1 | 3/2017 | Modak |
| 2017/0099854 A1 | 4/2017 | Mecrin et al. |
| 2017/0124550 A1 | 5/2017 | Oberli et al. |
| 2017/0215455 A1 | 8/2017 | Buck et al. |
| 2017/0251693 A1 | 9/2017 | Miladinov et al. |
| 2017/0258107 A1 | 9/2017 | Miladinov et al. |
| 2017/0265493 A1 | 9/2017 | Miladinov et al. |
| 2019/0230954 A1 | 8/2019 | Jani et al. |

FOREIGN PATENT DOCUMENTS

| | | | | |
|---|---|---|---|---|
| CN | 1048648 | A | | 1/1991 |
| CN | 1423525 | A | | 6/2003 |
| CN | 101247730 | A | | 8/2008 |
| CN | 101448407 | A | | 6/2009 |
| CN | 101453904 | A | | 6/2009 |
| CN | 101478885 | A | | 7/2009 |
| CN | 101557714 | A | | 10/2009 |
| CN | 101708026 | A | | 5/2010 |
| CN | 101873803 | A | | 10/2010 |
| CN | 102046020 | A | * 5/2011 ............... A23G 4/02 |
| CN | 102223807 | A | | 10/2011 |
| DE | 3933745 | A1 | | 4/1991 |
| DE | 10035461 | B4 | | 3/2004 |
| DE | 10338217 | B3 | | 1/2005 |
| EA | 0007647 | B1 | | 12/2006 |
| EP | 0150934 | A2 | | 7/1985 |
| EP | 0231984 | A2 | | 8/1987 |
| EP | 0273809 | A2 | | 7/1988 |
| EP | 0438923 | A1 | | 7/1991 |
| EP | 0657101 | A1 | | 6/1995 |
| EP | 0732057 | A1 | | 9/1996 |
| EP | 0941768 | A2 | | 9/1999 |
| EP | 0979714 | | | 2/2000 |
| EP | 1250847 | | | 10/2002 |
| EP | 1264544 | A2 | | 12/2002 |
| EP | 0759703 | B1 | | 9/2003 |
| EP | 1410718 | A1 | | 4/2004 |
| EP | 1514483 | A1 | | 3/2005 |
| EP | 1061814 | B1 | | 8/2006 |
| EP | 1894476 | | | 3/2008 |
| EP | 1894476 | A2 | | 3/2008 |
| EP | 2206437 | | | 7/2010 |
| EP | 2260717 | A1 | | 12/2010 |
| EP | 2712506 | A1 | | 4/2014 |
| EP | 2774492 | A2 | | 9/2014 |
| FR | 2350146 | A2 | | 12/1977 |
| FR | 2635441 | A1 | | 2/1990 |
| GB | 359458 | A | | 10/1931 |
| GB | 639695 | A | | 7/1950 |
| GB | 746101 | A | | 3/1956 |
| GB | 831028 | | | 3/1960 |
| GB | 1441446 | A | | 6/1976 |
| GB | 1497507 | A | | 1/1978 |
| GB | 2034572 | A | | 6/1980 |
| GB | 2042969 | A | | 10/1980 |
| GB | 2120517 | A | | 12/1983 |
| GB | 2124468 | A | | 2/1984 |
| JP | S4706226 | Y1 | | 3/1972 |
| JP | S52082756 | A | | 7/1977 |
| JP | S52082758 | A | | 7/1977 |
| JP | S54049367 | A | | 4/1979 |
| JP | S55135548 | A | | 10/1980 |
| JP | S5862898 | U | | 4/1983 |
| JP | S58111644 | A | | 7/1983 |
| JP | S59163381 | | | 11/1984 |
| JP | S60186250 | A | | 9/1985 |
| JP | S6128391 | U | | 2/1986 |
| JP | 61162136 | | | 7/1986 |
| JP | S61181367 | A | | 8/1986 |
| JP | 63177758 | A | | 1/1987 |
| JP | S62205753 | A | | 9/1987 |
| JP | S62224275 | A | | 10/1987 |
| JP | 63273438 | | | 11/1988 |
| JP | 6460332 | A | | 3/1989 |
| JP | 02286307 | A | | 11/1990 |
| JP | H04179445 | A | | 6/1992 |
| JP | H04215867 | A | | 8/1992 |
| JP | H0646760 | A | | 2/1994 |
| JP | H06189689 | A | | 7/1994 |
| JP | 07067554 | A | | 3/1995 |
| JP | H07233046 | A | | 9/1995 |
| JP | H0923862 | A | | 1/1997 |
| JP | 09065833 | | | 3/1997 |
| JP | 2000004792 | A | | 1/2000 |
| JP | 2000166477 | A | | 6/2000 |
| JP | 2002017266 | A | | 1/2002 |
| JP | 2002045117 | A | | 2/2002 |
| JP | 2002176904 | | | 6/2002 |
| JP | 2002516672 | A | | 6/2002 |
| JP | 2004141004 | A | | 5/2004 |
| JP | 2004517627 | A | | 6/2004 |
| JP | 2004314106 | A | | 11/2004 |
| JP | 2004321096 | A | | 11/2004 |
| JP | 2006102571 | A | | 4/2006 |
| JP | 2006204185 | A | | 8/2006 |
| JP | 2006345781 | A | | 12/2006 |
| JP | 2007000798 | A | | 1/2007 |
| JP | 2007028951 | A | | 2/2007 |
| JP | 2007029018 | A | | 2/2007 |
| JP | 2007215450 | A | | 8/2007 |
| JP | 2008539804 | A | | 11/2008 |
| JP | 2010011875 | A | | 1/2010 |
| JP | 4461255 | B2 | | 5/2010 |
| JP | 4711754 | B2 | | 6/2011 |
| KR | 20090039105 | | | 4/2009 |
| KR | 100919653 | | | 9/2009 |
| RU | 2214720 | | | 10/2003 |
| RU | 2325071 | C1 | | 5/2008 |
| SU | 839470 | A1 | | 6/1981 |
| WO | 94/22323 | A1 | | 10/1994 |
| WO | 9734708 | A1 | | 9/1997 |
| WO | 9945791 | A1 | | 9/1999 |
| WO | 0033971 | A1 | | 6/2000 |
| WO | 0215708 | A2 | | 2/2002 |
| WO | 200217851 | A2 | | 3/2002 |
| WO | WO02056697 | A1 | | 7/2002 |
| WO | 03047360 | A1 | | 6/2003 |
| WO | 2004073691 | A1 | | 9/2004 |
| WO | 2004112971 | A1 | | 12/2004 |
| WO | 2005089255 | A2 | | 9/2005 |
| WO | 2006125334 | A1 | | 11/2006 |
| WO | 2006127277 | A2 | | 11/2006 |
| WO | 2007056685 | A2 | | 5/2007 |
| WO | 2007076170 | A2 | | 7/2007 |
| WO | 2009036954 | A1 | | 3/2009 |
| WO | 2009070570 | A1 | | 6/2009 |
| WO | 2009108769 | A2 | | 9/2009 |
| WO | 2009135100 | A1 | | 11/2009 |
| WO | 2009140351 | A2 | | 11/2009 |
| WO | 2009151506 | | | 12/2009 |
| WO | 2010/006385 | A1 | | 1/2010 |
| WO | 2010000811 | A2 | | 1/2010 |
| WO | 2010062866 | A2 | | 6/2010 |
| WO | 2010062867 | A2 | | 6/2010 |
| WO | 2010092480 | A1 | | 8/2010 |
| WO | 2011044373 | A2 | | 4/2011 |
| WO | 2011063082 | A2 | | 5/2011 |
| WO | 2010/084759 | A2 | | 7/2011 |
| WO | 2011084759 | A2 | | 7/2011 |
| WO | 2011090520 | | | 7/2011 |
| WO | 2011117634 | A2 | | 9/2011 |
| WO | 2011154398 | A1 | | 12/2011 |
| WO | 2011159935 | A1 | | 12/2011 |
| WO | 2012125397 | A2 | | 9/2012 |

(56) References Cited

FOREIGN PATENT DOCUMENTS

| WO | 2013013045 A2 | 1/2013 |
|---|---|---|
| WO | 2013049800 A2 | 4/2013 |

OTHER PUBLICATIONS

Notification of the 1st CN Office Action with translation, CN Application No. 201810420045.2; Date Mailed: Apr. 23, 2021, pp. 1-17.
Bogaty, H. and Talmage, J.M. "Apparent Viscosity Of Chewing Gum", J. Texture Studies, vol. 9, pp. 299-309, Sep. 25, 1978.
Chinese Office Action; International Application No. 201711337861.9; International Filing Date: Dec. 14, 2017; Date of Mailing: Sep. 2, 2020; 17 pages.
European Office Action; International Application No. 17185358.3-1105; International Filing Date: Aug. 8, 2017; Date of Mailing: Aug. 28, 2020; 4 pages.
European Office Action; International Application No. 18213709.1-1106; International Filing Date: Dec. 18, 2018; Date of Mailing: Sep. 22, 2020; 4 pages.
Extended European Search Report; International Application No. 20181435.7-1106; International Filing Date: Jun. 22, 2020; Date of Mailing: Oct. 19, 2020; 13 pages.
Mexican Office Action; International Application No. MX/A/2016/015188; International Filing Date: Nov. 18, 2016; Date of Mailing: Mar. 11, 2020; 3 pages.
Chinese Office Action; International Application No. 201580024617.X; International Filing Date: Nov. 10, 2016; Date of Mailing: Jun. 16, 2020; 12 pages.
Chinese Office Action; International Application No. 201710866206.6; International Filing Date: Sep. 22, 2017; Date of Mailing: Apr. 8, 2020; 4 pages.
Japanese Office Action; International Application No. 2019-080968; International Filing Date: Apr. 2, 2016; Date of Mailing: May 8, 2020; 2 pages.
U.S. Non-Final Office Action; U.S. Appl. No. 13/522,767, filed Nov. 16, 2012; Date of Mailing: Jan. 6, 2020; 85 pages.
U.S. Non-Final Office Action; U.S. Appl. No. 14/233,796, filed Jun. 6, 2014; Date of Mailing: Feb. 19, 2020; 77 pages.
U.S. Non-Final Office Action; U.S. Appl. No. 15/108,624, filed Jun. 28, 2016; Date of Mailing: Jun. 26, 2020; 19 pages.
U.S. Non-Final Office Action; U.S. Appl. No. 14/430,083, filed Mar. 20, 2015; Date of Mailing: Mar. 25, 2020; 77 pages.
U.S. Non Final Office Action for U.S. Appl. No. 15/600,250, filed May 19, 2017; Date of Mailing: Nov. 5, 2019; 17 pages.
US Non-Final Office Action; U.S. Appl. No. 14/233,698, filed Jun. 6, 2014; Date of Mailing Jan. 7, 2020; 108 pages.
US Non-Final Office Action; U.S. Appl. No. 15/108,916, filed Jun. 29, 2016; Date of Mailing: Feb. 12, 2020; 75 pages.
Non Final Office Action for U.S. Appl. No. 15/609,830, filed May 31, 2017; Date of mailing: Jun. 28, 2019; pp. 1-22.
Non Final Office Action U.S. Appl. No. 15/609,311, filed May 31, 2017; Date of mailing: Jun. 28, 2019; pp. 1-21.
Decision of Final Rejection (with Translation); Japanese Application No. 2016-550532; Mailing Date: Dec. 20, 2018; 10 Pages.
English Translation of JP H06-46760. (Year: 1994), pp. 1-13.
Examination Report under Sections 12 & 13 of the Patents Act, 1970 and the Patent Rules, 2003; Indian Application No. 313/CHENP/2014; Mailing Date: Dec. 14, 2018; 7 Pages.
Extended European Search Report; European Application No. 18197983.2; Mailing Date: Feb. 12, 2019; 11 Pages.
Final Office Action; U.S. Appl. No. 13/522,767, filed Nov. 16, 2012; System and Method of Forming and Sizing Chewing Gum And/Or Altering Temperature of Chewing Gum; Notification Date: Nov. 29, 2018; 98 Pages.
Non-Final Office Action; U.S. Appl. No. 14/233,796, filed Jun. 6, 2014; Advanced Gum Forming; Notification Date: Nov. 2, 2018; 105 Pages.

Non-Final Office Action; U.S. Appl. No. 15/123,387, filed Sep. 2, 2016; Method for Manufacturing a Comestible; Notification Date: Oct. 26, 2018.
Non-Final Office Action; U.S. Appl. No. 14/430,083, filed Mar. 20, 2015; Advanced Gum Forming; Notification Date: Oct. 19, 2017; 21 Pages.
Notification of the First Office Action and Search Report; Chinese Application No. 2015/0026070.7; Mailing Date: Mar. 12, 2018; 17 Pages.
Office Action and Search Report; Chinese Application No. 201480046262.X; Date of Mailing: Nov. 2, 2018; 10 Pages.
U.S. Office Action; U.S. Appl. No. 13/522,767; Advisory Action; Date Mailed: Aug. 11, 2015, pp. 1-3.
U.S. Office Action; U.S. Appl. No. 13/522,767; Final Office Action; Date Mailed: Jun. 30, 2017, pp. 1-24.
U.S. Office Action; U.S. Appl. No. 13/522,767; Non-Final Office Action; Date Mailed: Dec. 13, 2016, pp. 1-24.
U.S. Office Action; U.S. Appl. No. 13/522,767; Non-Final Office Action; Date Mailed: Jun. 3, 2016, pp. 1-20.
U.S. Office Action; U.S. Appl. No. 14/004,343; Non-Final Office Aciton; Date Mailed: Sep. 6, 2018, pp. 1-16.
U.S. Office Action; U.S. Appl. No. 14/004,343; Advisory Action; Date Mailed: Apr. 20, 2017; pp. 1-5.
U.S. Office Action; U.S. Appl. No. 14/004,343; Advisory Action; Date Mailed: Dec. 14, 2015; pp. 1-8.
U.S. Office Action; U.S. Appl. No. 14/004,343; Final Office Action; Date Mailed: Dec. 30, 2016; pp. 1-13.
U.S. Office Action; U.S. Appl. No. 14/004,343; Final Office Action; Date Mailed: Sep. 17, 2015; pp. 1-43.
U.S. Office Action; U.S. Appl. No. 14/004,343; Non-Final Office Action; Date Mailed: May 23, 2016; pp. 1-13.
U.S. Office Action; U.S. Appl. No. 14/004,343; Notice of Allowance; Date Mailed: Jun. 7, 2017; pp. 1-8.
U.S. Office Action; U.S. Appl. No. 14/233,796; Final Office Action; Date Mailed: Feb. 5, 2018, pp. 1-23.
U.S. Office Action; U.S. Appl. No. 14/233,698; Non-Final Office Action; Date Mailed: May 4, 2017; pp. 1-87.
U.S. Office Action; U.S. Appl. No. 14/233,796; Non-Final Office Action; Date Mailed: Jul. 24, 2017, pp. 1-102.
U.S. Office Action; U.S. Appl. No. 15/108,624, filed Jun. 28, 2016; Non-Final Office Action; Date Mailed: Jan. 28, 2019, pp. 1-137.
U.S. Office Action; U.S. Appl. No. 15/108,916; Non-Final Office Action; Date Mailed: Sep. 19, 2018, pp. 1-17.
"What is Ultrasonic Spray Nozzle?", [Online], Jul. 16, 2013, [Apr. 18, 2018 Search], https://web.archive.org/web/20130716222437/http://www.ticjapan.com/japanese/products/atmizer.html>, 4 pages.
EP Examination Report; EP Application No. 15728967.9-1106; Date Mailed Apr. 30, 2018; 4 pages.
JP 2nd Office Action, Japanese Patent Application No. 2016-550532; Mail Date Apr. 27, 2018, 12 pages.
MX 2nd Office Action, Mexican Patent Application No. MX/a/2014/000795; Mail Date Apr. 11, 2018, 8 pages.
Anonymous: "Sugar Free Gum Product", GNPD, May 1, 2011, XP055397367, pp. 1-3; Retrieved from the Internet: URL: www.gnpd.com/sinatra/recordpage/1550406 [retrieved on Aug. 9, 2017].
Anonymous: "Wild Strawberry & Tangy Citrus Sugar-Free Gum," GNPD, Feb. 1, 2010 (Feb. 1, 2010), XP055397371, pp. 1-3; Retrieved from the Internet: URL: www.gnpd.com/sinatra/recordpage/1263179; [retrieved on Aug. 9, 2017].
AU 1st Office Action, AU Application No. 2009319826; Date Mailed: Jul. 2, 2012, pp. 1-4.
AU 1st Office Action, AU Application No. 2009319827; Date Mailed: Jul. 25, 2012, pp. 1-4.
AU 1st Office Action, AU Application No. 2009321276; Date Mailed: Jun. 21, 2012, pp. 1-4.
AU 1st Office Action, AU Application No. 2013206311; Date Mailed: Apr. 24, 2014, pp. 1-6.
AU 1st Office Action, AU Application No. 2015203194; Date Mailed: Jan. 22, 2016, pp. 1-5.
AU 2nd Office Action, AU Application No. 2009319826; Date Mailed: Oct. 10, 2012, pp. 1-4.
AU 2nd Office Action, AU Application No. 2009321276; Date Mailed: Oct. 11, 2012, pp. 1-3.

(56) References Cited

OTHER PUBLICATIONS

AU 2nd Office Action, AU Application No. 2013206311; Date Mailed: Nov. 26, 2014, pp. 1-5.
AU Notice of Acceptance; AU Application No. 2010343332; Dated: May 8, 2014, pp. 1-2.
AU Notice of Allowance, AU Application No. 2009319826; Date Mailed: Apr. 2, 2013, pp. 1-1.
AU Notice of Allowance, AU Application No. 2009319827; Date Mailed: Nov. 9, 2012, pp. 1-3.
AU Notice of Allowance, AU Application No. 2009321276; Date Mailed: Feb. 28, 2013, pp. 1-3.
AU Notice of Allowance, AU Application No. 2013206311; Date Mailed: Feb. 19, 2015, pp. 1-2.
Cerestra, "Polyols In Food," Denbigh Lloyd, Aug. 2001, pp. 1-12.
CN 1st Office Action with translation; CN Application No. 200980155688.8; Date Mailed: Nov. 5, 2012, pp. 1-28.
CN 1st Office Action with translation; CN Application No. 200980155689.2; Date Mailed: Nov. 19, 2012, pp. 1-26.
CN 1st Office Action with translation; CN Application No. 200980155690.5; Date Mailed: Oct. 29, 2012, pp. 1-14.
CN 1st Office Action with translation; CN Application No. 201180037795.8; Date Mailed: Aug. 26, 2013, pp. 1-16.
CN 1st Office Action with translation; CN Application No. 201180037796.2; Date Mailed: Aug. 26, 2013, pp. 1-12.
CN 1st Office Action with translation; CN Application No. 201380046385.9; Mail Date: Jan. 15, 2016, pp. 1-19.
CN 2nd Office Action with translation, CN Application No. 201280046306.X; Date Mailed: Nov. 2, 2015, pp. 1-31.
CN 2nd Office Action with translation; CN Application No. 200980155688.8; Date Mailed: Sep. 12, 2013, pp. 1-21.
CN 2nd Office Action with translation; CN Application No. 200980155689.2; Date Mailed: Jul. 10, 2013, pp. 1-17.
CN 2nd Office Action with translation; CN Application No. 200980155690.5; Date Mailed: Jun. 24, 2013, pp. 1-31.
CN 2nd Office Action with translation; CN Application No. 201280046229.8; Mail Date: Sep. 24, 2015, pp. 1-9.
CN 2nd Office Action with translation; CN Application No. 201280046231.5; Mail Date: Oct. 10, 2015, pp. 1-16.
CN 2nd Office Action with translation; CN Application No. 201380046385.9; Mail Date: Sep. 6, 2016, pp. 1-6.
CN 3rd Office Action with translation; CN Application No. 200980155688.8; Date Mailed: Apr. 19, 2016, pp. 1-24.
CN 3rd Office Action with translation; CN Application No. 200980155690.5; Date Mailed: Nov. 14, 2013, pp. 1-17.
CN 3rd Office Action with translation; CN Application No. 201280046231.5; Mail Date: Mar. 9, 2016, pp. 1-6.
CN 4th Office Action with translation; CN Application No. 200980155688.8; Date Mailed: Oct. 28, 2016, pp. 1-12.
CN Decision of Rejection with translation, CN Application No. 201280046306.X; Date Mailed: May 4, 2016, pp. 1-20.
CN Decision of Rejection with translation; CN Application No. 200980155688.8; Date Mailed: Feb. 7, 2014, pp. 1-20.
CN Decision of Rejection with translation; CN Application No. 201280046229.8; Mail Date: Apr. 14, 2016, pp. 1-7 (CDS0386CN).
CN Decision of Rejection with translation; CN Application No. 201280046231.5; Mail Date: Sep. 7, 2016, pp. 1-14.
CN Notice of Allowance with translation, CN Application No. 201280022799.3, Date Mailed: Sep. 9, 2015, pp. 1-4.
CN Notice of Allowance with translation; CN Application No. 200980155688.8; Date Mailed: May 4, 2017, pp. 1-4.
CN Notice of Allowance with translation; CN Application No. 200980155689.2; Date Mailed: Dec. 12, 2013, pp. 1-4.
CN Notice of Allowance with translation; CN Application No. 200980155690.5; Date Mailed: Apr. 30, 2014, pp. 1-4.
CN Notice of Allowance with translation; CN Application No. 201080065664.6; Date Mailed: Jul. 8, 2015 , pp. 1-6.
CN Notice of Allowance with translation; CN Application No. 201180037795.8; Date Mailed: Mar. 17, 2014, pp. 1-4.
CN Notice of Allowance with translation; CN Application No. 201180037796.2; Date Mailed: Mar. 17, 2014, pp. 1-14.

CN Notice of Allowance with translation; CN Application No. 201380046385.9; Mail Date: Mar. 15, 2017, pp. 1-4.
CN Notification of the Reexamination with translation for CN Patent Application No. 201280046231.5 dated Jul. 28, 2017.
CN Notification of the Reexamination with translation, CN Application No. 201280046306.X; Date Mailed: May 12, 2017, pp. 1-22.
CN Notification of the Reexamination with translation; CN Application No. 201280046229.8; Mail Date: Feb. 16, 2017, pp. 1-7.
CN Notification of the Reexamination with translation, CN Application No. 201280046306.X; Date Mailed: Dec. 22, 2016, pp. 1-20.
CN Request for Reexamination with translation; CN Application No. 201280046231.5; Mail Date: Dec. 22, 2016, pp. 1-2 .
CN Summary of the Decision of Reexamination with translation; CN Application No. 201280046229.8; Mail Date: Jun. 22, 2017, pp. 1-10.
E.B. Jackson, "Sugar Confectionery Manufacture," Blackie and Son Ltd. 1990, pp. 1-20.
EP Communication Extended European Search Report; Application No. 17185358.3-1375; Date Mailed: Oct. 4, 2017, pp. 1-8.
EP Communication Pursuant to Aricle 94(3) EPC, Application No. 12 741 210.4-1358; Date Mailed: May 12, 2017, pp. 1-8.
EP Communication Pursuant to Aricle 94(3) EPC, Application No. 12 741 210.4-1358; Date Mailed: Sep. 15, 2016, pp. 1-8.
EP Communication Pursuant to Aricle 94(3) EPC; Application No. 12 741 209.6-1358; Date Mailed: May 12, 2017, pp. 1-6.
EP Communication Pursuant to Aricle 94(3) EPC; Application No. 12 741 209.6-1358; Date Mailed: Sep. 15, 2016, pp. 1-10.
EP Communication Pursuant to Article 94(3) EPC; Application No. 09 756 643.4-1358; Date Mailed: Jul. 12, 2017, pp. 1-4.
EP Communication Pursuant to Article 94(3) EPC; Application No. 09 756 643.4-1358; Date Mailed: Oct. 6, 2016, pp. 1-7.
EP Communication Pursuant to Article 94(3) EPC; Application No. 09 810 783.2-1358; Date Mailed: Oct. 6, 2016, pp. 1-4.
EP Communication Pursuant to Article 94(3) EPC; Application No. 10 844 138.7-1375; Date Mailed: Feb. 22, 2017; pp. 1-6.
EP Communication Pursuant to Article 94(3) EPC; Application No. 11 726 558.7-1358; Date Mailed: May 18, 2015, pp. 1-5.
EP Communication Pursuant to Article 94(3) EPC; Application No. 11 781 895.5-1358; Date Mailed: May 22, 2015, pp. 1-4.
EP Communication pursuant to Article 94(3) EPC; Application No. 12 709 260.9-1358; Date Mailed: Feb. 1, 2017, pp. 1-4.
EP Communication Pursuant to Article 94(3) EPC; Application No. 12 741 209.6-1358; Date Mailed: Dec. 20, 2017, pp. 1-6.
EP Communication Pursuant to Article 94(3) EPC; Application No. 12 741 211.2-1358; Date Mailed: Mar. 23, 2017; pp. 1-6.
EP Communication Pursuant to Article 94(3) EPC; Application No. 12 741 211.2-1358; Date Mailed: Sep. 15, 2016; pp. 1-7.
EP Communication Pursuant to Article 94(3) EPC; Application No. 14 824 334.8-1375; Date Mailed: Aug. 17, 2017; pp. 1-14.
EP Communication Pursuant to Article 94(3) EPC; Application No. 14 824 335.5-1375; Date Mailed: Nov. 13, 2017, pp. 1-7.
EP Communication Pursuant to Rules 161(1) and 162 EPC; Application No. 09756643.4-2114 PCT/US2009065594; Date Mailed: Nov. 25, 2011, pp. 1-8.
EP Communication Pursuant to Rules 161(1) and 162 EPC; Application No. 09810783.2-2114 PCT/IB2009007718; Date Mailed: Jul. 21, 2011, pp. 1-2.
EP Communication Pursuant to Rules 161(1) and 162 EPC; Application No. 11726558.7-2114; Date Mailed: Jan. 9, 2013, pp. 1-2.
EP Communication Pursuant to Rules 161(1) and 162 EPC; Application No. 11781895.5-2114; Date Mailed: Jan. 9, 2013, pp. 1-2.
EP Communication Pursuant to Rules 161(1) and 162 EPC; Application No. 12741209.6-1358; Date Mailed Feb. 28, 2014, pp. 1-2.
EP Communication Pursuant to Rules 161(1) and 162 EPC; Application No. 12741210.4-1358; Date Mailed Feb. 28, 2014, pp. 1-2.
EP Communication Pursuant to Rules 161(1) and 162 EPC; Application No. 12741211.2-1358; Date Mailed Feb. 28, 2014, pp. 1-2.
EP Communication Pursuant to Rules 161(1) and 162 EPC; Application No. 13771024.0-1357; Date Mailed Apr. 29, 2015, pp. 1-2.
EP Communication Pursuant to Rules 161(1) and 162 EPC; Application No. 14723283.9-1357; Date Mailed: Nov. 24, 2015, pp. 1-2.
EP Communication Pursuant to Rules 161(1) and 162 EPC; Application No. 14824334.8-1375; Date Mailed: Aug. 10, 2016, pp. 1-2.

(56) References Cited

OTHER PUBLICATIONS

EP Communication Pursuant to Rules 161(1) and 162 EPC; Application No. 14824335.5-1375; Date Mailed: Aug. 10, 2016, pp. 1-2.
EP Communication Pursuant to Rules 161(1) and 162 EPC; Application No. 15709397.2-1358; Date Mailed: Oct. 14, 2016, pp. 1-2.
EP Communication Pursuant to Rules 161(1) and 162 EPC; Application No. 15728967.9-1358; Date Mailed: Jan. 20, 2017, pp. 1-2.
EP Communication Pursuant to Rules 161(1) and 162 EPC; Application No. 15729600.5-1375; Date Mailed: Dec. 23, 2016, pp. 1-2.
EP Communication under Rule 71(3) EPC; Application No. 09 810 783.2-1358; Date Mailed: Apr. 19, 2017, pp. 1-8.
EP Communication under Rule 71(3) EPC; Application No. 10 250 033.7-2114; Date Mailed: Jul. 23, 2012; pp. 1-5.
EP Communication under Rule 71(3) EPC; Application No. 11 726 558.7-1358; Date Mailed: Dec. 9, 2015, pp. 1-9.
EP Communication under Rule 71(3) EPC; Application No. 11 781 895.5-13588; Date Mailed: Jul. 29, 2015, pp. 1-7.
EP Communication under Rule 71(3) EPC; Application No. 13 771 024.0-1375; Date Mailed: Apr. 28, 2017; pp. 1-7.
EP Communication under Rule 94(3) EPC; Application No. 10 250 033.7-2114; Date Mailed: Feb. 10, 2011; pp. 1-7.
EP Communication under Rule 94(3) EPC; Application No. 10 250 033.7-2114; Date Mailed: Mar. 19, 2012; pp. 1-3.
EP Communication under Rule 94(3) EPC; Application No. 14 723 283.9-1375; Date Mailed: Feb. 6, 2016; pp. 1-2.
Final Rejection issued in U.S. Appl. No. 12/338,428 dated Sep. 12, 2014.
Final Rejection issued in U.S. Appl. No. 12/338,428 dated Nov. 25, 2011.
Final Rejection issued in U.S. Appl. No. 12/338,682 dated Apr. 30, 2012.
Final Rejection issued in U.S. Appl. No. 12/338,682 dated Jul. 23, 2013.
Final Rejection issued in U.S. Appl. No. 12/338,682 dated Mar. 25, 2014.
Food Protection Committee, "Chemicals Used in Food Processing", National Academy of Sciences, 1965, pp. 1-101.
International Preliminary Report on Patentability issued in PCT/US2008/087618 dated Jun. 22, 2010.
International Preliminary Report on Patentability issued in PCT/US2008/087625 dated Jun. 22, 2010.
International Preliminary Report on Patentability issued in PCT/US2014/052614 dated Mar. 1, 2016.
Flanyak, "Panning Technology, An Overview", The Manufacturing Confectioner, pp. 65-74, Jan. 1998.
International Search Report; International Application No. PCT/US2014/052614; International Filing Date: Aug. 26, 2014; Date of Mailing: Nov. 20, 2014; 4 Pages.
Invitation to Pay Additional Fees and, Where Applicable, Protect Fee; International Application No. PCT/US2009/065594; International Filing Date: Nov. 24, 2009, Date of Mailing: Mar. 30, 2010 pp. 1-4.
IPRP; International Application No. PCT/IB2009/007718; International Filing Date: Nov. 24, 2009, Date of Mailing: May 31, 2011, pp. 1-5.
IPRP; International Application No. PCT/US2009/065594; International Filing Date: Nov. 24, 2009, Date of Mailing: Sep. 27, 2011, pp. 1-8.
IPRP; International Application No. PCT/US2011/038738; International Filing Date: Jun. 1, 2011, Date of Mailing: Dec. 4, 2012, pp. 1-7.
IPRP; International Application No. PCT/US2011/038747; International Filing Date: Jun. 1, 2011, Date of Mailing: Dec. 4, 2012, pp. 1-9.
IPRP; International Application No. PCT/US2014/072708; International Filing Date: Dec. 30, 2014, Date of Mailing: Jul. 5, 2016, pp. 1-7.
IPRP; International Application No. PCT/US2015/018072; International Filing Date: Feb. 27, 2015, Date of Mailing: Sep. 6, 2016, pp. 1-9.
IPRP; International Application No. PCT/US2015/031074; International Filing Date: May 15, 2015, Date of Mailing: Nov. 22, 2016, pp. 1-7.
IPRP; International Application No. PCT/US2015/031742; International Filing Date: May 20, 2015, Date of Mailing: Nov. 22, 2016, pp. 1-9.
Japanese Office Action with Translation; JP Application No. 2016-535722; Mailing Date: Nov. 14, 2017; pp. 1-5.
JP 1st Office Action and translation, JP Application No. 2016-550532; Date Mailed: Jun. 19, 2017, pp. 1-11.
JP 1st Office Action with translation, JP Application No. 2011-538074; Mail Date: Feb. 5, 2013, pp. 1-7.
JP 1st Office Action with translation, JP Application No. 2011-538658; Mail Date: Feb. 5, 2013, pp. 1-7.
JP 1st Office Action with translation, JP Application No. 2011-538659; Mail Date: Feb. 19, 2013, pp. 1-6.
JP 1st Office Action with translation, JP Application No. 2013-256761; Mail Date: Mar. 10, 2015, pp. 1-6.
JP 1st Office Action with translation, JP Application No. 2013-513299; Mail Date: Feb. 4, 2014, pp. 1-7.
JP 1st Office Action with translation, JP Application No. 2013-513302; Mail Date: Feb. 4, 2014, pp. 1-7.
JP 1st Office Action with translation, JP Application No. 2014-171916; Mail Date: Oct. 13, 2015, pp. 1-4.
JP 1st Office Action with translation, JP Application No. 2015-527688; Mail Date: Feb. 3, 2016, pp. 1-10.
JP 1st Office Action with translation, JP Application No. 2016-045354; Mail Date: Jan. 17, 2017, pp. 1-7.
JP 1st Office Action with translation, JP Application No. 2016-045867; Mail Date: Jan. 17, 2017, pp. 1-6.
JP 1st Office Action with translation, JP Application No. 2016-130735; Mail Date: Apr. 25, 2017, pp. 1-11.
JP 1st Office Action with translation, JP Application No. 2016-249450; Mail Date: Jan. 9, 2018, pp. 1-4.
JP 1st Office Action with translation, JP Application No. 2016-535722; Mail Date: Mar. 29, 2017, pp. 1-8.
JP 1st Office Action with translation; JP Application No. 2016-535710; Date Mailed: May 25, 2017, pp. 1-5.
JP 2nd Office Action with translation, JP Application No. 2011-538074; Mail Date: Aug. 20, 2013, pp. 1-3.
JP 2nd Office Action with translation, JP Application No. 2011-538658; Mail Date: Aug. 6, 2013, pp. 1-6.
JP 2nd Office Action with translation, JP Application No. 2011-538659; Mail Date: Feb. 4, 2014, pp. 1-6.
JP 2nd Office Action with translation, JP Application No. 2013-513299; Mail Date: Oct. 14, 2014, pp. 1-5.
JP 2nd Office Action with translation, JP Application No. 2013-513302; Mail Date: Oct. 14, 2014, pp. 1-4.
JP 2nd Office Action with translation, JP Application No. 2014-521785; Mail Date: Nov. 10, 2015, pp. 1-4.
JP 2nd Office Action with translation, JP Application No. 2014-521788; Mail Date: Nov. 10, 2015, pp. 1-4.
JP 2nd Office Action with translation, JP Application No. 2014-521789; Mail Date: Oct. 6, 2015, pp. 1-4.
JP 3rd Office Action with translation, JP Application No. 2011-538074; Mail Date: Apr. 7, 2015, pp. 1-9.
JP 3rd Office Action with translation, JP Application No. 2011-538658; Mail Date: May 7, 2014, pp. 1-7.
JP 3rd Office Action with translation, JP Application No. 2011-538659; Mail Date: Nov. 25, 2014, pp. 1-3.
JP 3rd Office Action with translation, JP Application No. 2014-521785; Mail Date: Feb. 28, 2017, pp. 1-11.
JP 3rd Office Action with translation, JP Application No. 2014-521788; Mail Date: May 9, 2017, pp. 1-25.
Jp OA with translation Application No. 2016-559836 dated Sep. 4, 2017, pp. 1-14.
Jp OA with translation Application No. 2016-562229 dated Sep. 21, 2017, pp. 1-7.
JP Pre-Appeal Report with translation, JP Application No. 2013-557853; Mail Date: Dec. 15, 2015, pp. 1-5.
JPD 1st Office Action with translation, JP Application No. 2014-139188; Mail Date: Jul. 28, 2015, pp. 1-4.

(56) References Cited

OTHER PUBLICATIONS

JPD 1st Office Action with translation, JP Application No. 2015-196927; Mail Date: Jul. 12, 2016, pp. 1-11.
JPD 2nd Office Action with translation, JP Application No. 2014-139188; Mail Date: Jan. 19, 2016, pp. 1-5.
JPD 2nd Office Action with translation, JP Application No. 2015-196927; Mail Date: May 9, 2017, pp. 1-9.
Lynch, "Soft Panning", The Manufacturing Confectioner, pp. 47-50, Nov. 1987.
Mexican 1st Office Action with translation, MX Application No. MX/a/2013/010024; Mail Date: Jul. 29, 2015, pp. 4.
Mexican Office Action with Translation; MX Application No. MX/a/2014/000794; Date Mailed: Nov. 3, 2017, pp. 1-9.
International Search Report; International Application No. PCT/US2015/031742; International Filing Date: May 20, 2015; Date of Mailing: Dec. 16, 2015; 7 Pages.
MX 1st Office Action and Translation; Mexican Application No. MX/a/2014/000795; Date Mailed: Oct. 31, 2017; pp. 1-11.
MX 1st Office Action and Translation; Mexican Application No. MX/a/2014/000819; Date Mailed: Oct. 23, 2017; pp. 1-7.
MX 1st Office Action with translation; Mexican Patent Application No. MX/a/2012/008505; Date Mailed: Aug. 7, 2015, pp. 1-7.
MX 1st Office Action; Mexican Patent Application No. MX/a/2011/005647; Mail Date: Aug. 30, 2013, pp. 1-7.
MX 1st Office Action; Mexican Patent Application No. MX/a/2011/005652; Mail Date: Jun. 17, 2015, pp. 1-12.
MX 1st Office Action; Mexican Patent Application No. MX/a/2011/005693; Mail Date: Jul. 17, 2013, pp. 1-3.
MX 1st Office Action; Mexican Patent Application No. MX/a/2012/013889; Mail Date: Jan. 27, 2016, pp. 1-4.
MX 1st Office Action; Mexican Patent Application No. MX/a/2012/013982; Mail Date: Jan. 21, 2016, pp. 1-5.
MX 2nd Office Action with translation; Mexican Patent Application No. MX/a/2012/008505; Date Mailed: Feb. 19, 2016, pp. 1-7.
MX 2nd Office Action; Mexican Patent Application No. MX/a/2011/005652; Mail Date: Sep. 23, 2015, pp. 1-4.
MX 3rd Office Action with translation; Mexican Patent Application No. MX/a/2012/008505; Date Mailed: Oct. 25, 2016, pp. 1-9.
MX 4th Office Action with translation; Mexican Patent Application No. MX/a/2012/008505; Date Mailed: Jun. 27, 2017, pp. 1-7.
Non-Final Office Action issued in U.S. Appl. No. 12/338,428 dated Mar. 17, 2014.
Non-Final Office Action issued in U.S. Appl. No. 12/338,428 dated Apr. 12, 2011.
Non-Final Office Action issued in U.S. Appl. No. 12/338,682 dated Jan. 16, 2013.
Non-Final Office Action issued in U.S. Appl. No. 12/338,682 dated Sep. 26, 2014.
Non-Final Office Action issued in U.S. Appl. No. 12/338,682 dated Nov. 23, 2011.
Notice of Allowance issued in U.S. Appl. No. 12/338,428 dated Nov. 18, 2015.
PCT Invitation to Pay Additional Fees and, Where applicable, Protest Fee; PCT International Applciation No. PCT/US2012/028232; International Filing Date: Mar. 8, 2012, Date of Mailing: Aug. 27, 2012, pp. 1-8.
PCT Invitation to Pay Additional Fees and, Where applicable, Protest Fee; PCT International Applciation No. PCT/US2012/047404; International Filing Date: Jul. 19, 2012, Date of Mailing: Nov. 21, 2012, pp. 1-8.
PCT Invitation to Pay Additional Fees and, Where applicable, Protest Fee; PCT International Applciation No. PCT/US2012/047409; International Filing Date: Jul. 19, 2012, Date of Mailing: Nov. 26, 2012, pp. 1-9.
PCT Invitation to Pay Additional Fees and, Where applicable, Protest Fee; PCT International Applciation No. PCT/US2012/047411, International Filing Date: Jul. 19, 2012, Date of Mailing: Nov. 26, 2012, pp. 1-8.

PCT Invitation to Pay Additional Fees and, Where applicable, Protest Fee; PCT International Applciation No. PCT/US2015/031742; International Filing Date: May 20, 2015, Date of Mailing: Sep. 18, 2015, pp. 1-6.
PCT IPRP; International Application No. PCT/US2010/051085; International Filing Date: Oct. 1, 2010, Date of Mailing: Aug. 2, 2012; pp. 1-8.
PCT IPRP; International Application No. PCT/US2013/060584; International Filing Date: Sep. 19, 2013, Date of Mailing: Mar. 24, 2015; pp. 1-6.
PCT IPRP; International Application No. PCT/US2014/034032; International Filing Date: Apr. 14, 2014, Date of Mailing: Oct. 20, 2015; pp. 1-9.
PCT IPRP; International Application No. PCT/US2014/072702; International Filing Date: Dec. 30, 2014, Date of Mailing: Jul. 5, 2016, pp. 1-11.
PCT Notification of Transmittal of The International Search Report; International Application No. PCT/IB2009/007718; International Filing Date: Nov. 24, 2009, Date of Mailing: May 21, 2010, pp. 1-6.
PCT Notification of Transmittal of The International Search Report; International Application No. PCT/US2009/065594; International Filing Date: Nov. 24, 2009, Date of Mailing: Sep. 22, 2011, pp. 1-6.
PCT Notification of Transmittal of The International Search Report; International Application No. PCT/US2011/038738; International Filing Date: Jun. 1, 2011, Date of Mailing: Feb. 6, 2012, pp. 1-5.
PCT Notification of Transmittal of The International Search Report; International Application No. PCT/US2011/038747; International Filing Date: Jun. 1, 2011, Date of Mailing: Sep. 6, 2011, pp. 1-5.
PCT Notification of Transmittal of The International Search Report; International Application No. PCT/US2014/072702; International Filing Date: Dec. 30, 2014, Date of Mailing: Mar. 16, 2015, pp. 1-5.
PCT Notification of Transmittal of The International Search Report; International Application No. PCT/US2014/072708; International Filing Date: Dec. 30, 2014, Date of Mailing: Mar. 3, 2015, pp. 1-4.
PCT Notification of Transmittal of The International Search Report; International Application No. PCT/US2015/018072; International Filing Date: Feb. 27, 2015, Date of Mailing: Jun. 17, 2015, pp. 1-6.
PCT Notification of Transmittal of The International Search Report; International Application No. PCT/US2015/031074; International Filing Date: May 15, 2015, Date of Mailing: Sep. 15, 2015, pp. 1-5.
PCT Written Opinion; International Application No. PCT/IB2009/007718; International Filing Date: Nov. 24, 2009, Date of Mailing: May 21, 2010, pp. 1-4.
PCT Written Opinion; International Application No. PCT/US2009/065594; International Filing Date: Nov. 24, 2009, Date of Mailing: Sep. 22, 2011, pp. 1-7.
PCT Written Opinion; International Application No. PCT/US2011/038738; International Filing Date: Jun. 1, 2011, Date of Mailing: Feb. 6, 2012, pp. 1-7.
PCT Written Opinion; International Application No. PCT/US2011/038747; International Filing Date: Jun. 1, 2011, Date of Mailing: Sep. 6, 2011, pp. 1-7.
PCT Written Opinion; International Application No. PCT/US2012/028232; International Filing Date: Mar. 8, 2012, Date of Mailing: Nov. 16, 2012, pp. 1-10.
PCT Written Opinion; International Application No. PCT/US2012/047404; International Filing Date: Jul. 19, 2012, Date of Mailing: Feb. 27, 2013, pp. 1-11.
PCT Written Opinion; International Application No. PCT/US2012/047411; International Filing Date: Jul. 19, 2012, Date of Mailing: Feb. 27, 2013, pp. 1-11.
PCT Written Opinion; International Application No. PCT/US2013/060584; International Filing Date: Sep. 19, 2013, Date of Mailing: Nov. 25, 2013, pp. 1-6.
PCT Written Opinion; International Application No. PCT/US2014/072702; International Filing Date: Dec. 30, 2014, Date of Mailing: Mar. 16, 2015, pp. 1-10.
PCT Written Opinion; International Application No. PCT/US2014/072708; International Filing Date: Dec. 30, 2014, Date of Mailing: Mar. 3, 2015, pp. 1-6.
PCT Written Opinion; International Application No. PCT/US2015/018072; International Filing Date: Feb. 27, 2015, Date of Mailing: Jun. 17, 2015, pp. 1-8.

(56) References Cited

OTHER PUBLICATIONS

PCT Written Opinion; International Application No. PCT/US2015/031074; International Filing Date: May 15, 2015, Date of Mailing: Sep. 15, 2015, pp. 1-6.
PCT Written Opinion; International Application No. PCT/US2015/031742; International Filing Date: May 20, 2015, Date of Mailing: Dec. 16, 2015, pp. 1-8.
Hartel, "Crystallization and Drying During Hard Panning", The Manufacturing Confectioner, pp. 51-57, Feb. 1995.
PCT Written Opnion; International Application No. PCT/US2012/047409; International Filing Date: Jul. 19, 2012, Date of Mailing: Feb. 27, 2013, pp. 1-10.
Restriction Requirement issued in U.S. Appl. No. 12/338,428 dated Jan. 5, 2011.
Restriction Requirement issued in U.S. Appl. No. 12/338,682 dated Apr. 18, 2011.
Restriction Requirement issued in U.S. Appl. No. 12/338,682 dated Jul. 14, 2011.
Robert Boutin, et al., "Sugarless Hard Panning," The Manufacturing Confectioner, pp. 35-42, Nov. 2004.
Robert D. Walter, "Panning—the specialist's specialty" Part 1;Candy & Snack Industry, pp. 43-51; Dec. 1974.
Robert D. Walter, "Panning—the Specialist's Specialty"; Part 2; Candy & Snack Industry; pp. 44-51; Jan. 1975.
Robert L. Davidson, "Handbook of Water-Soluble Gums and Resins," Handbook of Water-Soluble Gums and Resins, Jun. 5, 1980, Chapter 24, Xanthan Gum, pp. 1-33.
RU 1st Office Action with translation, RU Application No. 2014106418/13(010180); Date Mailed: Jul. 3, 2015, pp. 1-5.
RU 1st Office Action with translation; RU Application No. 2014106421/13(010183); Mail Date: Jul. 6, 2015, pp. 1-10.
RU 1st Office Action with Translation; RU Patent Application No. 2016130013/13(046711); Date Mailed: Nov. 21, 2017; pp. 1-9.
RU Decision of Granting with translation, RU Application No. 2014106418/13(010180); Date Mailed: Jan. 13, 2016, pp. 1-24.
RU Decision of Granting with translation; Application No. 2013145559/13(070430); Mail Date: Mar. 26, 2015; pp. 1-15.
RU Decision of Granting with translation; RU Application No. 2014106421/13(010183); Mail Date: Jan. 26, 2016, pp. 1-19
RU Decision of Granting with translation; RU Application No. 2014106422/13(010184); Mail Date: Nov. 26, 2015, pp. 1-22.
Russian Office action issued in Russian Patent Application No. 2014106421/13(010183) dated Oct. 20, 2015, 7 pages.
Russian Office Action with Translation; RU Patent Application No. 2014106422/13(010184);Date Mailed: Aug. 11, 2015; pp. 11.
Supervising Editor Aya Kagawa, "Fourth Standard Tables of Food Composition in Japan," First Edition, Kagawa Education Institute of Nutrition, Published Department, (1994), pp. 72-73.
Supplementary European Search Report for App. No. 08 866 890 dated Jan. 22, 2014.
Supplementary European Search Report for App. No. 08868714 dated Jan. 15, 2014.
U.S. Office Action; U.S. Appl. No. 12/352,110; Advisory Action; Date Mailed: Dec. 16, 2011, pp. 1-3.
U.S. Office Action; U.S. Appl. No. 12/352,110; Final Office Action; Date Mailed: Oct. 25, 2011, pp. 1-30.
U.S. Office Action; U.S. Appl. No. 12/352,110; Non-Final Office Action; Date Mailed: May 25, 2011, pp. 1-26.
U.S. Office Action; U.S. Appl. No. 12/352,110; Notice of Allowance; Date Mailed: Mar. 22, 2012, pp. 1-8.
U.S. Office Action; U.S. Appl. No. 12/352,110; Restriction Requirement; Date Mailed: Feb. 2, 2011, pp. 1-5.
U.S. Office Action; U.S. Appl. No. 12/624,440; Final Office Action; Date Mailed: Aug. 20, 2015, pp. 1-38.
U.S. Office Action; U.S. Appl. No. 12/624,440; Final Office Action; Date Mailed: Dec. 15, 2016, pp. 1-19.
U.S. Office Action; U.S. Appl. No. 12/624,440; Final Office Action; Date Mailed: Mar. 14, 2013, pp. 1-28.
U.S. Office Action; U.S. Appl. No. 12/624,440; Interview Summary; Date Mailed: Sep. 14, 2016, pp. 1-3.
U.S. Office Action; U.S. Appl. No. 12/624,440; Non-Final Office Action; Date Mailed: Mar. 13, 2012, pp. 1-44.
U.S. Office Action; U.S. Appl. No. 12/624,440; Non-Final Office Action; Date Mailed: Mar. 2, 2015, pp. 1-39.
U.S. Office Action; U.S. Appl. No. 12/624,440; Non-Final Office Action; Date Mailed: May 16, 2016, pp. 1-20.
U.S. Office Action; U.S. Appl. No. 12/624,440; Notice of Allowance; Date Mailed: Mar. 1, 2017, pp. 1-20.
U.S. Office Action; U.S. Appl. No. 12/624,440; Restriction Requirement; Date Mailed: Feb. 17, 2012, pp. 1-8.
U.S. Office Action; U.S. Appl. No. 12/624,440; Supplemental Notice of Allowance; Date Mailed: Jun. 2, 2017, pp. 1-8.
U.S. Office Action; U.S. Appl. No. 12/624,453; Final Office Action; Date Mailed: Aug. 25, 2015, pp. 1-37.
U.S. Office Action; U.S. Appl. No. 12/624,453; Final Office Action; Date Mailed: Dec. 16, 2016, pp. 1-17.
U.S. Office Action; U.S. Appl. No. 12/624,453; Final Office Action; Date Mailed: Mar. 14, 2013, pp. 1-29.
U.S. Office Action; U.S. Appl. No. 12/624,453; Interview Summary; Date Mailed: Aug. 24, 2016, pp. 1-3.
U.S. Office Action; U.S. Appl. No. 12/624,453; Non-Final Office Action; Date Mailed: Feb. 13, 2015, pp. 1-35.
U.S. Office Action; U.S. Appl. No. 12/624,453; Non-Final Office Action; Date Mailed: Mar. 13, 2012, pp. 1-47.
U.S. Office Action; U.S. Appl. No. 12/624,453; Non-Final Office Action; Date Mailed: May 19, 2016, pp. 1-26.
U.S. Office Action; U.S. Appl. No. 12/624,453; Notice of Allowance; Date Mailed: Mar. 6, 2017, pp. 1-19.
U.S. Office Action; U.S. Appl. No. 12/624,453; Supplemental Notice of Allowance; Date Mailed: Jun. 2, 2017, pp. 1-8.
U.S. Office Action; U.S. Appl. No. 12/624,436; Advisory Action; Date Mailed: Apr. 11, 2013, pp. 1-7.
U.S. Office Action; U.S. Appl. No. 12/624,436; Final Office Action; Date Mailed: Aug. 21, 2015, pp. 1-43.
U.S. Office Action; U.S. Appl. No. 12/624,436; Final Office Action; Date Mailed: Dec. 14, 2016, pp. 1-20.
U.S. Office Action; U.S. Appl. No. 12/624,436; Final Office Action; Date Mailed: Feb. 14, 2013, pp. 1-31.
U.S. Office Action; U.S. Appl. No. 12/624,436; Interview Summary; Date Mailed: Aug. 10, 2016, pp. 1-3.
Bharat Jani, "Advanced Gum Forming," U.S. Appl. No. 61/510,119, filed Jul. 21, 2011.
Bharat Jani, "System and Method of Forming and Sizing Chewing Gum and/or Altering Temperature of Chewing Gum," U.S. Appl. No. 61/247,997, filed Oct. 2, 2009.
Bharat Jani, "System and Method of Forming Multilayer Confectionery," U.S. Appl. No. 61/451,805, filed Mar. 11, 2011.
Glenn Visscher, "Parallel Gum Component Mixing Systems and Methods," U.S. Appl. No. 61/045,764, filed Apr. 17, 2008.
James Duggan, "Gum Structure Miding Systems and Methods," U.S. Appl. No. 61/016,016, filed Dec. 21, 2007.
James Duggan, "Gum Structure Mixing Systems and Methods," U.S. Appl. No. 61/036,626, filed Mar. 14, 2008.
Roman Oberli, "System and Methods for Passive Ticketing," U.S. Appl. No. 62/247,997, filed Oct. 29, 2015.
U.S. Office Action; U.S. Appl. No. 12/624,436; Interview Summary; Date Mailed: May 13, 2013, pp. 1-3.
U.S. Office Action; U.S. Appl. No. 12/624,436; Non-Final Office Action; Date Mailed: Feb. 12, 2015, pp. 1-39.
U.S. Office Action; U.S. Appl. No. 12/624,436; Non-Final Office Action; Date Mailed: Jun. 2, 2016, pp. 1-30.
U.S. Office Action; U.S. Appl. No. 12/624,436; Non-Final Office Action; Date Mailed: Mar. 15, 2012, pp. 1-49.
U.S. Office Action; U.S. Appl. No. 12/624,436; Notice of Allowance; Date Mailed: Mar. 8, 2017, pp. 1-12.
U.S. Office Action; U.S. Appl. No. 12/624,436; Supplemental Notice of Allowance; Date Mailed: Mar. 29, 2017, pp. 1-2.
U.S. Office Action; U.S. Appl. No. 12/624,436; Supplemental Notice of Allowance; Date Mailed: May 26, 2017, pp. 1-8.
U.S. Office Action; U.S. Appl. No. 13/483,638; Advisory Action; Date Mailed: Jul. 18, 2014, pp. 1-3.
U.S. Office Action; U.S. Appl. No. 13/483,638; Final Office Action; Date Mailed: Apr. 23, 2014, pp. 1-13.

(56) References Cited

OTHER PUBLICATIONS

U.S. Office Action; U.S. Appl. No. 13/483,638; Non-Final Office Action; Date Mailed: Sep. 12, 2013, pp. 1-15.
U.S. Office Action; U.S. Appl. No. 13/483,638; Notice of Allowance; Date Mailed: Jan. 16, 2015, pp. 1-9.
U.S. Office Action; U.S. Appl. No. 13/701,104; Advisory Action; Date Mailed: Mar. 1, 2016, pp. 1-8.
U.S. Office Action; U.S. Appl. No. 13/701,104; Final Office Action; Date Mailed: Nov. 4, 2015, pp. 1-24.
U.S. Office Action; U.S. Appl. No. 13/701,104; Non-Final Office Action; Date Mailed: Apr. 9, 2015, pp. 1-111.
U.S. Office Action; U.S. Appl. No. 13/701,196; Final Office Action; Date Mailed: Jun. 24, 2015, pp. 1-34.
U.S. Office Action; U.S. Appl. No. 13/701,196; Non-Final Office Action; Date Mailed: Dec. 17, 2014, pp. 1-22.
U.S. Office Action; U.S. Appl. No. 13/701,196; Non-Final Office Action; Date Mailed: Jul. 7, 2014, pp. 1-40.
U.S. Office Action; U.S. Appl. No. 13/701,196; Restriction Requirement; Date Mailed: Feb. 13, 2014, pp. 1-7.
U.S. Office Action; U.S. Appl. No. 14/004,343; Restriction Requirement; Date Mailed: Jan. 15, 2014, pp. 1-8.
U.S. Office Action; U.S. Appl. No. 14/233,698; Restriction Requirement; Date Mailed: Feb. 17, 2017; pp. 1-8.
U.S. Office Action; U.S. Appl. No. 14/233,796; Restriction Requirement; Date Mailed: Mar. 3, 2017, pp. 1-9.
U.S. Office Action; U.S. Appl. No. 14/430,083; Restriction Requirement; Date Mailed: Jul. 5, 2017, pp. 1-7.
William Raleigh, "HSH as a Bulking Agent in Confections," The Manufacturing Confectioner, Nov. 1995, pp. 57-59.
Written Opinion of the International Searching Authority; International Application No. PCT/US2008/087618 dated Apr. 8, 2009.
Written Opinion of the International Searching Authority; International Application No. PCT/US2008/087625 dated Apr. 7, 2009.
Written Opinion of the International Searching Authority; International Application No. PCT/US2014/052614; International Filing Date: Aug. 26, 2014; Date of Mailing: Nov. 20, 2014; 8 Pages.
Australian Government; IP Australia; Notice of Acceptance; dated: Jun. 25, 2015; 2 pages.
Decision of Rejection; Japanese Patent Office; JP Patent Application No. 2013-557853; Transmission Date: Jun. 2, 2015; 4 pages.
Gorodissky; Official Action; Application No. 2014106422; Issued May 14, 2015; 4 pages.
United States Patent and Trademark Office; Final Office Action, Issued Jun. 3, 2015, U.S. Appl. No. 13/522,767, 31 pages.
The State Intellectual Property Office of P. R. China, Office Action, Date of mail: Mar. 12, 2015, 6 pages.
ISR PCT/US2013/060584 dated Nov. 25, 2013.
CN OA Application No. 201280046306.X dated Feb. 2, 2015, with English Translation.
CN OA Application No. 201280046229.8 dated Jan. 19, 2018.
CN OA Application No. 201280046231.5 dated Jan. 14, 2015.
JP OA Application No. 2014-521785 dated Feb. 3, 2015.
US Non-Final Office Action dated Feb. 26, 2015.
CA OA dated Jan. 16, 2015, Application No. 2,829,351.
CN OA dated Dec. 31, 2014, Application No. 201080065664.6, with English Translation.
JP OA dated Jan. 13, 15, Application No. 2014521788, with English Translation.
JP OA dated Nov. 18, 2014, Application No. 2013-557853, with English Translation.
JP OA dated Jan. 20, 15, Application No. 2014-521789, with English Translation.
RU OA dated Jan. 20, 2014, with English Translation, Application No. 2013145559.
U.S. Appl. No. 13/522,767, Non-Final Office Action dated Nov. 10, 2014.
Canadian Application No. 2,787,148, Office Action dated May 20, 2014.
Notice of Allowance, Japanese Patent Application No. 2012-549982, dated Oct. 7, 2014, with English Translation.
Decision of Granting, 2012135675/13(057620), dated Aug. 15, 2014, with English Translation.
ISR & WO PCT/US2014/034032 dated Sep. 8, 2014.
AU ER Application No. 2012229325 dated Jul. 11, 2014.
CN OA Application No. 201280022799.3 dated Jul. 7, 2014 with English Translation.
CN 2d OA_201080065664.6 dated Jun. 24, 2014.
Non-Final Office Action, U.S. Appl. No. 14/004,343, dated Jul. 3, 2014.
JP OA 2012-549982 dated Mar. 4, 2014 with English Translation.
RU OA_2012135675 dated Apr. 23, 2014 with English Translation.
RU OA 2012135675 dated Feb. 3, 2014 with English translation.
IPRP and Written Opinion PCT/US2012/047411 dated Jan. 21, 2014.
IPRP and Written Opinion PCT/US2012/047404 dated Jan. 21, 2014.
IPRP and Written Opinion PCT/US2012/047409 dated Jan. 21, 2014.
U.S. Appl. No. 60/618,222, filed Oct. 13, 2004, expired; parent of US20060078508 and US2006078509.
Anonymous: "Bar Manufacturing," Sollich, Nov. 17, 2007 (Nov. 17, 2007), XP002678488, Retrieved from the Internet: URL:http://web.archive.org/web/20061117002445/http://www.sollich.com/webEnglisch/produkte/riegelherstellung/conbarsuesswaren.php?navid=7 [retrieved on Jun. 25, 2012] the whole document.
OA CN Patent Application 201080065664.6 dated Apr. 3, 2013.
Database FSTA [Online] International Food Information Service (IFIS), Frankfurt-Main, DE; 1992, Anaonymous: "How gum is made.", XP002687037, Database accession No. FS-1992-09-K-0010 abstract.
EP SR Application No. 10844138.7-1357 / 2525667 dated Oct. 14, 2013.
AU ER Pattent Application No. 2010343332 dated Jun. 3, 2013.
IRPR PCT/US2012/028232 dated Sep. 17, 2013.
ISR PCT/US2012/047404 dated Feb. 27, 2013.
ISR PCT/US2012/047409 dated Feb. 27, 2013.
Isr PCT/US2012/047411 dated Feb. 27, 13.
ISR Jun. 29, 2011 PCT/US/2010/051085.
ISR PCTUS2012028232_WO2012125397A9_dated Mar. 1, 2013.
CN OA 201080065664.6 dated Aug. 9, 2013.
JP OA 2012-549982 dated Sep. 17, 2013.
CA OA Application No. 2,787,148 / File No. 13427-852—dated Aug. 14, 2013.
Written Opinion Jun. 29, 2011 PCT US2010 051085.
Database FSTA [Online] International Food Information Service (IFIS), Frankfurt-Main, DE; 1992, Anonymous: "How gum is made.", XP002687037, Database accession No. FS-1992-09-K-0010 abstract.
Chinese Office Action for Chinese Application No. 201580026070.7; Office Action Report Mail Date Dec. 9, 2019; (pp. 1-13—With Machine Translation).
Chinese Office Action for Chinese Application No. 201580026070.7; Office Action Report Mail Date Nov. 30, 2018; (pp. 1-16—With Machine Translation).
Mexican Office Action for Mexican Application No. MX/a/2019/000267; Office Action Report Mail Date Sep. 21, 2023; (9 Pages; with partial translation).
Brazilian Office Action for Brazil Application No. BR112016016620-5; Office Action Report Mail Date Nov. 9, 2021; (pp. 1-14—With Machine Translation).
Brazilian Office Action for Brazilian Application No. BR112016016620-5; Office Action Report Mail Date Aug. 3, 2021; (pp. 1-18—With Machine Translation).
Chinese Office Action for Chinese Application No. 20140067736.9; Office Action Report Mail Date Jan. 19, 2023; (pp. 1-7).
Chinese Office Action for Chinese Application No. 201580010596.6; Office Action Report Mail Date Aug. 17, 2023; (pp. 1-24—With Machine Translation).
Chinese Office Action for Chinese Application No. 201580024617.X; Office Action Report Mail Date Mar. 4, 2019; (pp. 1-13—With Machine Translation).

(56) References Cited

OTHER PUBLICATIONS

Chinese Office Action for Chinese Application No. 201580024617. X; Office Action Report Mail Date Jan. 8, 2020; (pp. 1-8—With Machine Translation).
Chinese Office Action for Chinese Application No. 201580024617. X; Office Action Report Mail Date Aug. 23, 2019; (pp. 1-7—With Machine Translation).
Chinese Office Action for Chinese Application No. 201710386468.2 Office Action Report Mail Date Oct. 14, 2020; (pp. 1-10—With Machine Translation).
Chinese Office Action for Chinese Application No. 201711337861.9; Office Action Report Mail Date Oct. 15, 2021; (pp. 1-12—With Machine Translation).
Chinese Office Action for Chinese Application No. 201711337861.9; Office Action Report Mail Date Mar. 31, 2021; (pp. 1-14—With Machine Translation).
Chinese Office Action for Chinese Application No. 201810420045.2; Office Action Report Mail Date Jan. 10, 2023; (pp. 1-14—With Machine Translation).
Chinese Office Action for Chinese Application No. 201810420045.2; Office Action Report Mail Date Feb. 21, 2022; (pp. 1-13—With Machine Translation).
Chinese Office Action for Chinese Application No. 2019-080968; Office Action Report Mail Date Jul. 11, 2022; (pp. 1-17—With Machine Translation).
Chinese Office Action for Chinese Application No. 202010202922.6; Office Action Report Mail Date Nov. 2, 2022; (pp. 1-11—With Machine Translation).
Copy of Chinese Office Action for Chinese Application No. 201580010596.6; Office Action Report Mail Date Apr. 27, 2023; (pp. 1-9—With Machine Translation).
European Appeal Decision Issued for European Application No. 15729600.5, Report Mail Date Jul. 24, 2023.
European Notice of Opposition for European Application No. 15729600.5; Report Mail Date Sep. 23, 2021 (23 Pages).
European Office Action for European Application No. 15728967.9-1106; Report Mail Date Apr. 15, 2019; 4 pages.
European Office Action for European Application No. 15729600.5; Office Action Report Mail Date Apr. 11, 2019 (pp. 1-6).
European Office Action for European Application No. 20 181 435.7; Office Action Report Mail Date Jul. 14, 2023; (pp. 1-6).
European Summons to Attend Oral Hearing for European Application No. 15729600.5; Report Mailed Sep. 30, 2022 (pp. 1-20).
Final Office Action for U.S. Appl. No. 15/311,962, filed Nov. 17, 2016; Report Mail Date Mar. 7, 2023 (16 Pages).
Indian Office Action for Indian Application No. 202348000131; Office Action Report Mail Date Apr. 11, 2023; (pp. 1-3).
Indian Office Action for Indian Patent Application No. 201948021226, Office Action Report Mail Date Jul. 12, 2022 (pp. 1-5).
Japanese Office Action for Japanese Application No. 2016-559836; Office Action Report Mail Date Jul. 3, 2018 (pp. 1-6—With Machine Translation).
Japanese Office Action for Japanese Application No. 2016-559836; Office Action Report Mail Date Jun. 27, 2019 (pp. 1-5—With Machine Translation).
Japanese Office Action for Japanese Application No. 2019-080968; Office Action Report Mail Date Dec. 9, 2021; (pp. 1-8—With Machine Translation).
Japanese Office Action for Japanese Application No. 2021-119486; Office Action Report Mail Date Jan. 5, 2023 (pp. 1-4 —With Machine Translation).
Japanese Office Action for Japanese Application No. 2021-119486; Office Action Report Mail Date Jun. 14, 2022; (pp. 1-2—With Machine Translation).
Japanese Office Action; International Application No. 2019-080968; International Filing Date: Apr. 2, 2016; Date of Mailing: Jan. 20, 2021; 7 pages.
Mexican Office Action for Mexican Application No. MX/a/2014/000795; Office Action Report Mail Date Dec. 17, 2020; (pp. 1-40—With Machine Translation).
Mexican Office Action for Mexican Application No. MX/a/2016/015009; Office Action Report Mail Date Jul. 12, 2021; (pp. 1-6—With Machine Translation).
Mexican Office Action for Mexican Application No. MX/a/2018/009635; Office Action Report Mail Date Jul. 12, 2022; (pp. 1-10—With Machine Translation).
Mexican Office Action for Mexican Application No. MX/a/2018/009635; Office Action Report Mail Date Jan. 3, 2023; (pp. 1-9).
Mexican Office Action for Mexican Application No. MX/a/2019/001451; Office Action Report Mail Date Nov. 25, 2022; (pp. 1-6—With Machine Translation).
Mexican Office Action for Mexican Application No. MX/a/2023/011965; Office Action Report Mail Date Oct. 18, 2023; (22 Pages; with translation).
Mexican Office Action for Mexican Application No. MX/a/2023/011967; Office Action Report Mail Date Oct. 18, 2023; (22 Pages; with translation).
Second Office Action issued in Mexican Application No. MX/a/2019/000267 with a mail date of Mar. 7, 2024; 7 pages.
U.S. Non-Final Office Action for U.S. Appl. No. 15/311,326, filed Nov. 15, 2016; Report Mail Date Mar. 10, 2023 (11 Pages).

* cited by examiner

SYSTEM AND METHOD FOR FORMING AND COOLING CHEWING GUM

CROSS REFERENCE TO RELATED APPLICATIONS

This is a divisional of U.S. Non-Provisional application Ser. No. 14/233,829, filed Jun. 6, 2014, which is a U.S. National Stage of application no. PCT/US2012/047411, filed on Jul. 19, 2012, which claims priority to U.S. Provisional Application Ser. No. 61/510,123, filed Jul. 21, 2011, the disclosures of which are incorporated herein by their reference.

FIELD

The disclosure relates generally to a gum processing system and method, and more particularly to a system and method for forming and cooling gum.

BACKGROUND

In conventional gum processing lines, gum that is formed and sized into desirable dimensions (slab, sheet, pellets, etc.) must be cooled and then conditioned for up to 48 hours before the folded slabs, sheets, or pellets can be stacked on top of each other or collected together without sticking. Furthermore, a powder or particulate material is typically added to the gum at some point during the processing, so as to further prevent the gum from sticking to various components of the gum processing line, as well as sticking to other gum pieces during stacking.

Gum conditioning that lasts for extended periods of time can cause an undesirable interruption in the processing and eventual packaging of gum pieces. In addition, application of powder (and the removal thereof) can increase energy consumption of the overall system, and have an undesirable effect on the final product if the powder is not effectively removed.

Accordingly, a system for forming and cooling gum in a manner that reduces conditioning time and powder usage would be desirable.

SUMMARY

Disclosed is a system for forming and cooling gum, the system including a forming system configured to size the gum to include a substantially uniform thickness between about 0.3 mm to 10 mm, a cooling device that is disposed in-line with the forming system and configured to continuously receive the gum from the forming system at an entry point of the cooling device, and a multi-pass conveying system configured to continuously transport the gum from the entry point to an exit point of the cooling device, the forming system and the cooling device being configured to form and cool the gum to be in a condition for stacking or collecting upon exiting the exit point of the cooling device.

Also disclosed is a method for forming and cooling gum, the method including forming the gum to include desirable dimensions; continuously transporting the gum to an entry point of a cooling device, and continuously transporting the gum from the entry point to an exit point of the cooling device via a multi-pass conveying apparatus; wherein the gum exits the cooling device in a condition for stacking or collecting.

Additionally disclosed is a system for forming and cooling gum, the system including a forming system configured to size the gum to include desirable dimensions, and a set of cooling rollers disposed in-line with the forming system and configured to continuously receive the gum from the forming system, the forming system and the set of cooling rollers being configured to form and cool the gum to be in a condition for stacking or collecting upon exiting the exit point of the cooling device.

Further disclosed is a system for forming and cooling gum, the system including a forming system configured to size the gum to include a substantially uniform thickness between about 0.3 mm to 10 mm, a cooling unit including multiple cooling devices, the cooling unit being disposed in-line with the forming system and configured to continuously receive the gum from the forming system at an entry point of the cooling unit, and a multi-pass conveying system configured to continuously transport the gum from the entry point to an exit point of the cooling unit, the forming system and the cooling unit being configured to form and cool the gum to be in a condition for stacking or collecting upon exiting the exit point of the cooling unit.

Still further disclosed is a system for cooling gum including a cooling device including an entry point and an exit point, and a multi-pass conveying system configured to continuously transport the gum from the entry point to the exit point of the cooling device, the multi-pass conveying system being configured to simultaneously impart conductive cooling to the gum at vertically opposing surfaces of the gum.

Additionally disclosed is a method for processing gum, the method including mixing the gum via a mixing device, continuously transporting the gum from the mixing device to a forming system; forming the gum to include desirable dimensions via the forming system, continuously transporting the gum from the forming system to an entry point of a cooling unit including at least one cooling device, continuously transporting the gum from the entry point to an exit point of the cooling unit via a multi-pass conveying apparatus, wherein the gum exits the cooling unit in a condition for stacking or collecting, continuously transporting the gum from the cooling unit to a packaging system, and packaging the gum.

BRIEF DESCRIPTION OF THE FIGURES

The accompanying drawings incorporated in and forming a part of the specification embodies several aspects of the present invention and, together with the description, serve to explain the principles of the invention. In the drawings.

DETAILED DESCRIPTION

Before turning in greater detail to the systems and methods discussed below, some general compositional information about gum will be provided. Chewing gum comprises in large part of components that are usually never swallowed, gum base, which is the rubber-like chewing component. Chewing gum also comprises a consumed portion including sweeteners, flavors and the like, and may also include other candy or food product integrated therewith in layers or as ingredients. The gum base is relatively unique in food processing in that it introduces the material with a resiliency and elasticity relative to processing and also provides a relatively non-conductive or insulating material that does not transfer heat very well. This provides unique processing difficulties. Relative to processing, the temperature of the processed gum product greatly affects viscosity as well as other processing characteristics such as elasticity and resiliency.

Further, different types of gum recipes will also alter processing considerations, and there generally is a desire to run different gum recipes on the same equipment or lines. Some of the ingredients handle processing quite well. Other ingredients such as flavors may be subject to flash off due to heat, thereby diminishing the amount of flavor in the final consumable product. Other ingredients such as encapsulated sweeteners, are sensitive to shear forces (e.g. due to substantial pressure, intense mixing, processing force and the like) and thus can be damaged during processing. These factors all provide different challenges relative to sizing the gum to a small bit size portion and conditioning of the gum for packaging in gum packaging. For purpose of understanding, some lexicography and typical gum composition components will be discussed below.

As used herein, any recited gum may include, but not be limited to, compositions ranging from and inclusive of compounded elastomer to finished gum, which may include compounded elastomer in addition to some compounding aids, master batch gum base, compounded elastomer in addition to some subsequent gum ingredients, compounded elastomer in addition to some gum base ingredients and some subsequent gum ingredients, gum base, gum base in addition to some subsequent gum ingredients, master batch finished gum, and finished gum.

In addition to the various chewing gums mentioned above, it should be appreciated that the below discussed systems and methods may be used to form and size confectionary or candy, combinations of gum ingredients with confectionary or candy ingredients, and combinations of gum with confectionary or candy, as disclosed in U.S. Patent Publication No. 2008/0166449, International Publication No. WO 2011/044373, and International Publication No. WO 2010/092480 the teachings and disclosures of which are hereby incorporated by reference in their entireties to the extent not inconsistent with the present disclosure.

Figure 1:
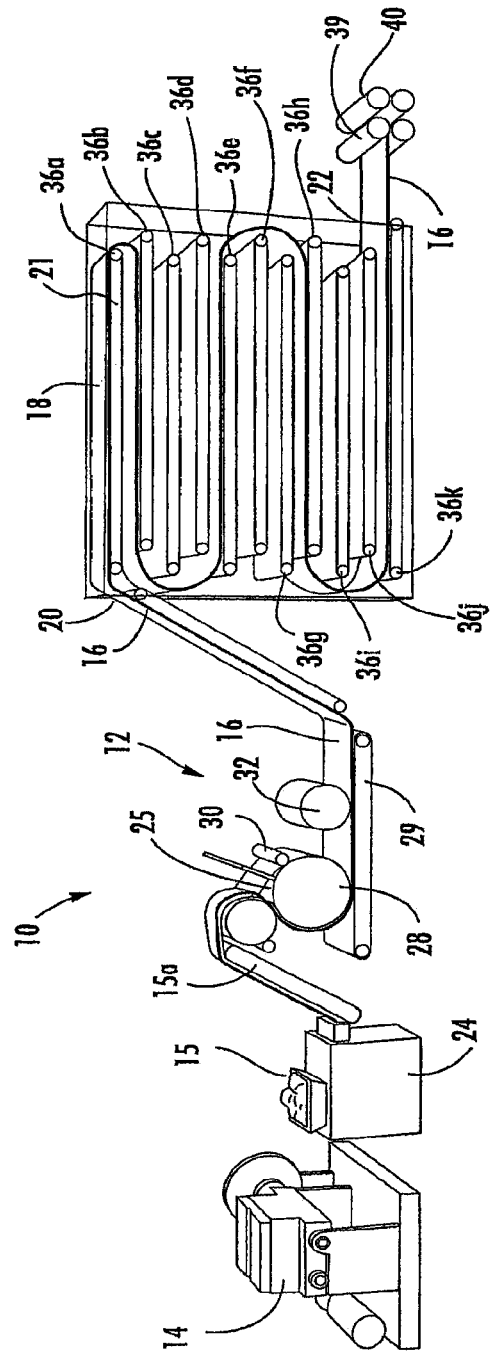
FIG. 1 is a schematic and perspective illustration of a system for forming and cooling gum according to a first exemplary embodiment.

Referring now to FIG. 1, a system 10 for forming and cooling gum is illustrated. The system includes a forming apparatus or system portion 12 that forms/sizes a gum mass 15 (which is mixed to include desirable ingredients in a gum mixer 14) into a gum slab 16 including a desirable thickness, such as a substantially uniform thickness between about. 1 mm to 60 mm, and more particularly 0.3 mm to 10 mm over the whole slab 16 or at least a portion of the slab 16, and a desirable width, such as a substantially uniform width that is greater than 50 cm over the whole slab 16 or at least a portion of the slab 16, between 5 mm and 2000 mm over the whole slab 16 or at least a portion of the slab 16, or between 225 mm and 450 mm over the whole slab 16 or at least a portion of the slab 16. The system 10 also includes a cooling device 18 (such as cooling housing 18 shown in the Figures without a front wall) that is disposed in-line with the forming apparatus 12 and configured to continuously receive the gum slab 16 from the forming apparatus 12 at an entry point 20 of the cooling housing 18. The cooling housing 18 includes a multi-pass conveying apparatus or system portion 21 that continuously transports the gum slab 16 from the entry point 20 to an exit point 22, thereby cooling the gum slab 16 to a point of being in condition for stacking (without sticking) upon exiting the cooling housing 18. These various components of the system 10, and the manner in which they operate to form and cool the gum, will be discussed in greater detail hereinbelow.

As shown in FIG. 1, the gum mass 15 is prepared for forming and cooling within the system 10 via gum mixer 14. The gum mixer 14 mixes the gum to include desirable ingredients and a desirable consistency. The resulting gum mass 15 is then transported to the forming apparatus 12 of the gum system 10. The gum mixer 14 may be disposed in line with the gum system 10, such that the gum system 10 continuously receives the gum mass 15 from the mixer 14 via a device such as a conveyor belt.

In the exemplary embodiment of FIG. 1, the gum mass 15 is transported from the mixer 14 to a pre-extruding device 24, which extrudes the mass as a gum slab 15a. However, it should be appreciated that this pre-extruder 24 may be removed from the system 10, and the gum mass 15 may simply be transported directly to collection area 25 (which may include a collection device such as the hopper 27 shown in FIG. 2) disposed immediately upstream of a gap between rollers 26 and 28. The pre-extruded slab 15a may also collect at the collection area 25 disposed immediately upstream of a gap between rollers 26 and 28, as shown in FIG. 1.

As the gum mass 15 or collected slab 15a passes through the gap between the rollers 26 and 28, it is deformed to include a desirable thickness, such as a substantially uniform thickness (over at least a portion thereof) between about 0.3 mm to 10 mm. In the exemplary embodiment of FIG. 1, oil is applied to the lower roller 28, and therefore the gum, via oil applicator 30. However, it should be appreciated that oil may also be applied via applicator to the upper roller 26, and/or directly to the gum slab 16, slab 15a, or mass 15. In addition, it should be noted that the forming apparatus 12 may include multiple sets of rollers 26 and 28 (three sets in an exemplary embodiment) that each receive a gum mass 15 or pre-extruded slab 15a and deform the gum mass or pre-extruded slab into multiple slabs 16 of a desirable thickness (three slabs in an exemplary embodiment) that are stacked one on top of the other to form a multi-layer slab of gum to be transported to downstream areas of the system 10.

Upon being pulled through and exiting the gap between the counter rotating rollers 26 and 28 (the counter rotation of the roller pulling the gum through the gap), the gum slab 16 is transported along a relative back of the lower roller 28 down to a conveyor 29. In the exemplary embodiment of FIG. 1, the conveyor 29 transports the gum slab 16 to an optional smoothing roller 32, which smoothes and removes irregularities from an upper surface of the slab 16. The now desirably sized slab 16 (desirably sized with regards to at least width and thickness) is then ready for continuous transport to the cooling housing 18.

As is shown in FIG. 1, the cooling housing 18 is positioned in line with the forming apparatus 12 so as to continuously receive the gum slab 16 from the forming apparatus 12 via a conveyor belt 34. In the exemplary embodiment of FIG. 1, the gum slab 16 is continually transported via conveyor 34 to the entry point 20, which is an opening to the housing disposed at a relatively upper portion thereof. This conveyor 34 transports the slab 16 to the multi-pass conveying system 21 disposed within the cooling housing 18, and does so continuously in that the slab is transported from the forming apparatus 12 to the cooling housing 18 without having to place the gum in holding area (such as an area for conditioning). In general, continuous transporting or receiving may be defined as transporting or receiving with necessitating placement in a holding area.

As shown in the exemplary embodiment of FIG. 1, the area of the conveyor 34, which is between the forming apparatus 12 (ending at the forming roller 32) and the cooling housing 18, may be absent any gum processing equipment beyond merely transporting equipment such as the conveyor 34. However, this area of the conveyor 34 may optionally include processing equipment such as but not limited to gum drying equipment, a particulate adding equipment, printing equipment, spraying equipment, and rollers configured to at least one form, smooth, cut, and score.

Turning now to the multi-pass conveying system 21 disposed in the housing 18, the exemplary embodiment of FIG. 1 shows a system 21 that includes a series of vertically displaced conveyor belts 36a-k. The vertically displaced belts 36a-k allow for the multiple passes of the multi-pass conveying system 21. While the conveying system 21 of this embodiment shows eleven belts 36a-k, it should be appreciated that any number of belts may be used to impart a desirable amount of cooling to the gum slab 16. In addition, though the exemplary embodiment of FIG. 1 shows the entry point 20 to be at a level of belt 36a and the exit point 22 to be at a level of belt 36k, it should be appreciated that the housing 18 may include entry and exit openings (that are closable via doors) at levels of each belt 36a-k.

As the gum slab 16 enters the housing 18 it is disposed upon conveyor belt 36a. Belt 36a transports the gum slab 16 from the entry point 20 to an end of belt 36a disposed opposite of the entry point 20. Upon reaching the end of the belt 36a, the gum slab 16 falls to a lower belt moving in an opposing direction to belt 36a. In FIG. 1, this belt is 36b. However, it should be appreciated that the gum slab may fall to any lower belt moving in an opposing direction. For example, when the gum slab 16 reaches an end of belt 36b, it falls to directionally opposite belt 36e, thereby by-passing belts 36c-d. This by-passing of belts (which is also shown with regards to belts 36e-h and belts 36h-k) can be beneficial to the system in that allows the gum slab 16 to have a larger turn radius that is less likely to damage the integrity of the gum slab 16. The by-passing of various belts may be assisted by guide shields disposed between vertically adjacent belts (such as belt 36b and belt 36c). In addition, transportation of the gum slab 16 between vertically adjacent belts (such as belt 36a and 36b) is assisted via the horizontal staggering or offset of each vertically adjacent belt as shown in FIG. 1.

Regardless of whether each belt in the multi-pass system 21 is used, or whether certain belts are by-passed to increase turn radius and maintain slab integrity, the gum slab 16 will include enough passes (i.e. be transported by enough belts) along the multi-pass system 21 and residence time within the cooling housing 18 to cool the slab to a desirable temperature. In the exemplary embodiment of FIG. 1, this cooling is imparted to the slab via convective and conductive cooling, and cools the gum slab 16 from a temperature at or above 40° C. upon entry at the entry point 20 to a temperature at or below 25° C. upon exit at the exit point 22. In a further exemplary embodiment, the gum slab is cooled to 0-20° C., more specifically 10° C.-20° C., and even more specifically 15° C. at the exit point 22. It is notable that, in an exemplary embodiment of the system 10, temperature change decreases with each subsequent pass through the housing 18. That is, temperature change in the first pass will be greater than temperature change in the second pass, and even greater than temperature change in the last pass (should the housing 18 include more than two passes). Further, an exemplary embodiment of the system 10 employs a residence time of approximately 6 minutes in order to cool the gum slab 16 (particularly a gum slab including a thickness of about 5.5 mm) to a temperature at or below 25° C.

Figure 1A:
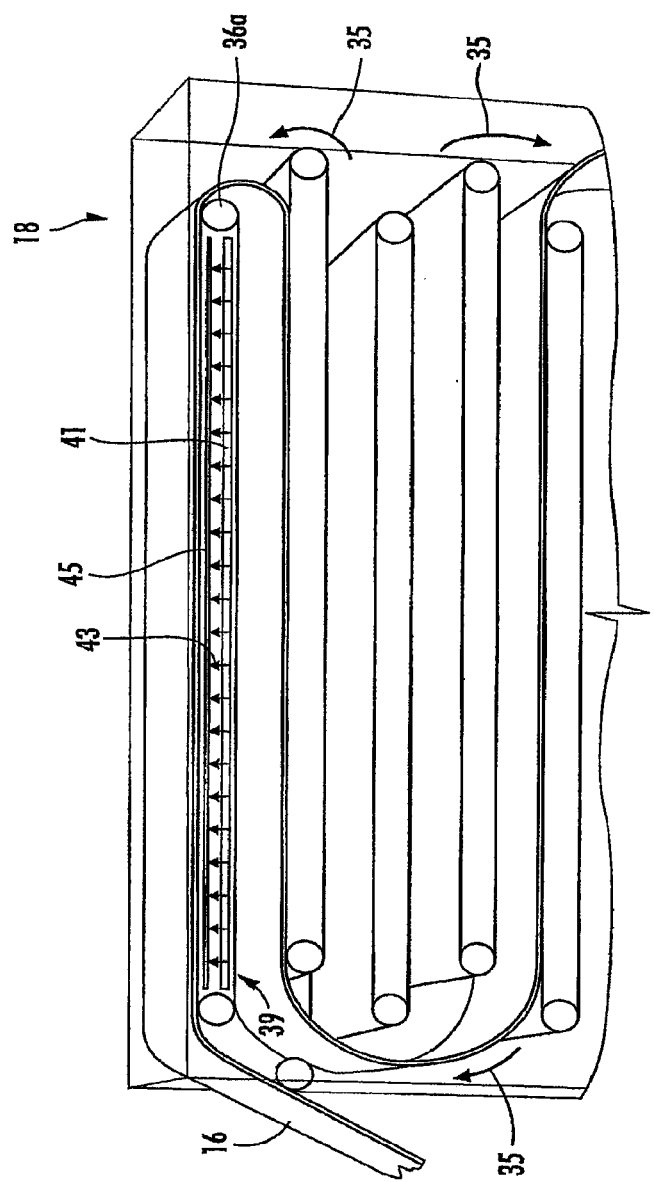
FIG. 1A is a partial schematic and perspective illustration of the system of FIG. 1.

Turning now to a manner by which the cooling housing 18 and multi-pass system 21 cool the gum slab 16, it should be noted that the slab 16 includes two surfaces available for cooling (i.e. the upper and lower surfaces of the slab 16 relative to the belt carrying the slab). As such, a housing and multi-pass system able to cool the slab 16 at these two surfaces would be desirable and efficient relative to a system that could only cool at one of the surfaces. Referring to FIG. 1A, exemplary embodiments of the housing 18 and multi-pass system 21, as capable of cooling the slab 16 at both surfaces of the slab, are illustrated.

As shown in FIG. 1A, convective currents 35 circulating within the housing and around/between the belts 36a-k may cool the upper or exposed surfaces 33 of the slab 16 via convection. In an exemplary embodiment, these currents 35 are cross flow currents that run horizontally perpendicular to gum flow (despite the more vertical direction of the arrows demonstrating current flow 35 as shown in FIG. 1A). The currents 35 (along with any cooling created by the cooled belts) may create an internal housing air temperature of 5° to 10° C. These convective currents 35 may be achieved via any known means for forcing air within a cooling housing, such as but not limited to cross flow forced convection achieved via slot fans or other fans, which has the effect of removing heat from the gum slab 16.

In addition to the convective cooling via currents 35, the lower surfaces 37 of the slab 16 (i.e. the surfaces that will contact the belts) may also be cooled via conductive cooling imparted from the cooled belts 36a-k. In the exemplary embodiment of FIG. 1A, the belts 36a-k may be cooled in any desirable manner, such as but not limited to a fluid circulation system 39 as shown by way of example in belt 36a (shown in cross-section). In this exemplary embodiment, the system 39 includes a fluid channel 41 with fluid nozzles 43 configured to spray a chilled fluid onto a thermally conductive support 45 (just beneath a relative upper surface of the belt 36a). The cooled support 45 (which may be stainless steel) imparts a conductive cooling to the belt 36a, which thereby imparts conductive cooling to the slab 16.

Figure 1B:
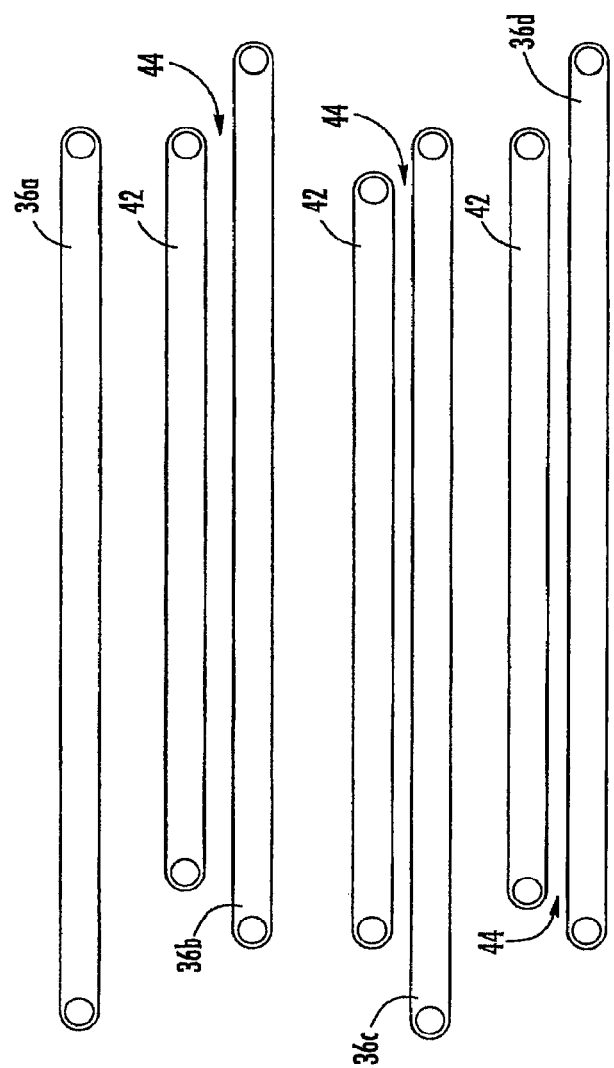
FIG. 1B is a partial schematic and perspective illustration of the system of a system for forming and cooling gum according to a first exemplary embodiment.

Of course, it should also be appreciated that the slab 16 may be cooled at one surface (via either of the convective or conductive cooling discussed above), with the slab 16 requiring more residence time within the housing (via slower belts, more passes/belts, etc.) to compensate for the less efficient cooling. In addition, and as shown in FIG. 1B, the multi-pass system 21 may include upper belts 42 configured to contact the upper surface 33 of the slab 16 at the same time the lower belts (i.e. 36a-d in this example) contact the lower surface 37 of the slab 16. The upper belts 42 are adjustably spaced from the lower belts 36a-d so as to create a gap 44 that is substantially equal to a thickness of the slab flowing therebetween. Like the cooled belt discussed above, each of the belts 40 and 36a-k (36a-d in the example shown in FIG. 1B) may be cooled via a fluid circulation system 39. However, the belts 40 will include systems 39 that are vertically reversed relative to that which is shown in belt 36a of FIG. 1B. That is, the fluid channel 41 is disposed in a relatively upper portion of the belts 40, and the conductive support 45 is disposed in a relatively lower portion, so as to impart conductive cooling to the upper surface 33 of the slab 16. The belts 40 and 36*a-k* rotate in opposite directions, thereby pulling the slab through the gap 44. This pulling of the slab through the gap 44 will cause little to no deformation or compression of the slab 16

Turning back now to FIG. 1, upon reaching the exit point 22 the gum slab 16 has been cooled via the above discussed cooling to a point where it is in condition for stacking. This means that the slab 16 has been cooled to a point where it may be folded and stacked (one fold in direct contact with another) without sticking to each other. In addition, the slab 16 may be scored and cut into desirably sized and shaped sheets (the scoring being in a longitudinal direction of movement on the belts), and these sheets may be stacked in direct contact with each other without sticking to each other. Such scoring and cutting may occur via scoring rollers 38 and cutting rollers 40 disposed in proximity to the exit point 22. These scoring and cutting rollers 38 and 40 may be optionally cooled (via any desirable means for cooling rollers) so as to help maintain the cut pieces of the exiting slab 16 at a desirably cooled temperature.

After being scored and cut into stackable sheets, the pieces may then be transported to further processing and packaging systems. These systems (not shown in the Figures) may be disposed in line with the cooling housing 18 (and thus the rest of the gum system 10), such that the packaging system will eventually and continuously receive the gum from the cooling tunnel 18 via a device such as a conveyor belt. In this manner, the system 10 may allow for in line, continuous processing of the gum from mixing to packaging.

Figure 2:
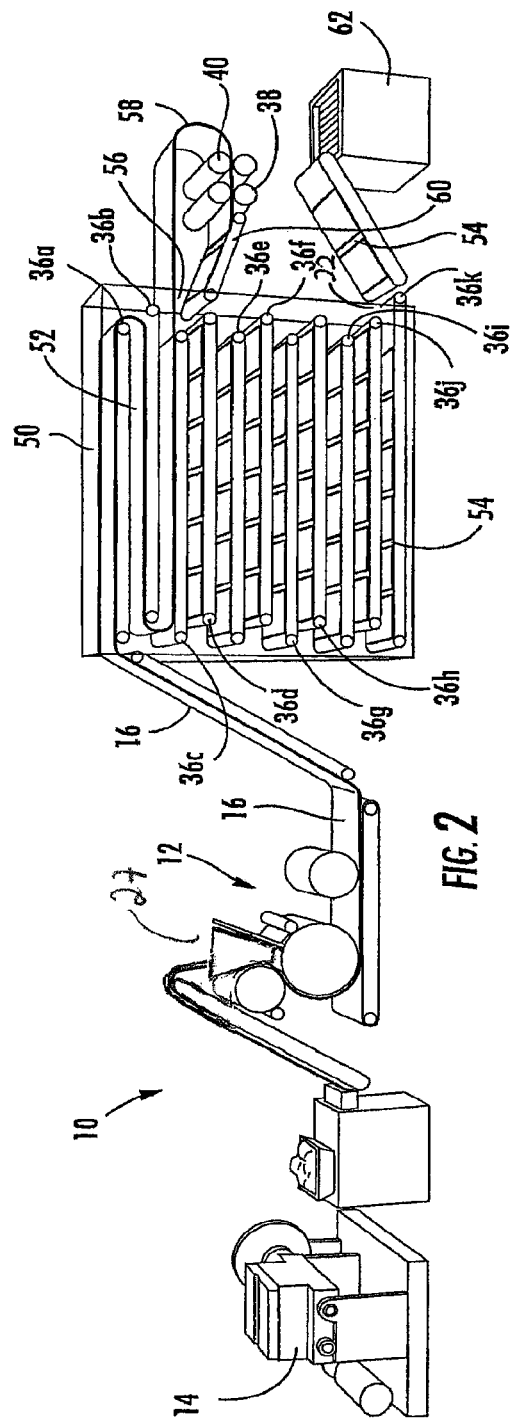
FIG. 2 is a schematic and perspective illustration of a system for forming and cooling gum according to another exemplary embodiment.
Figure 3:
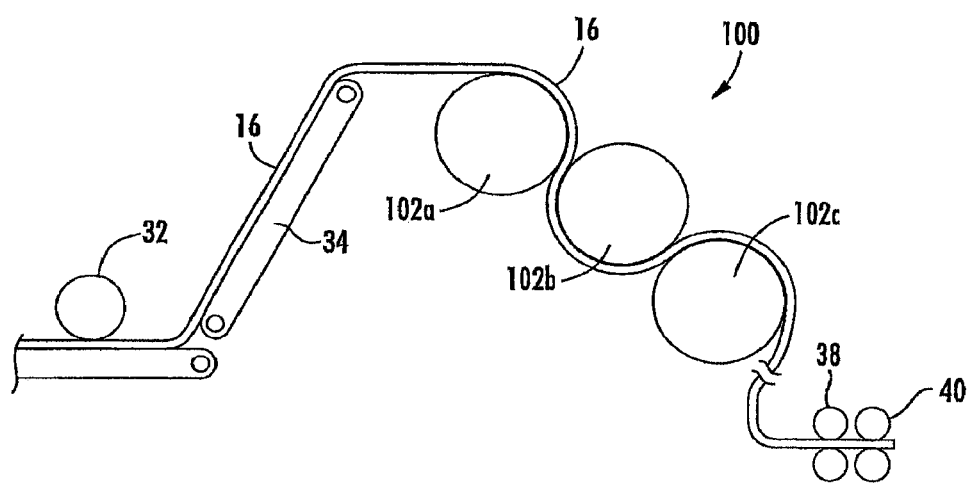
FIG. 3 is a partial schematic illustration of a system for forming and cooling gum according to yet another exemplary embodiment.
Figure 4:
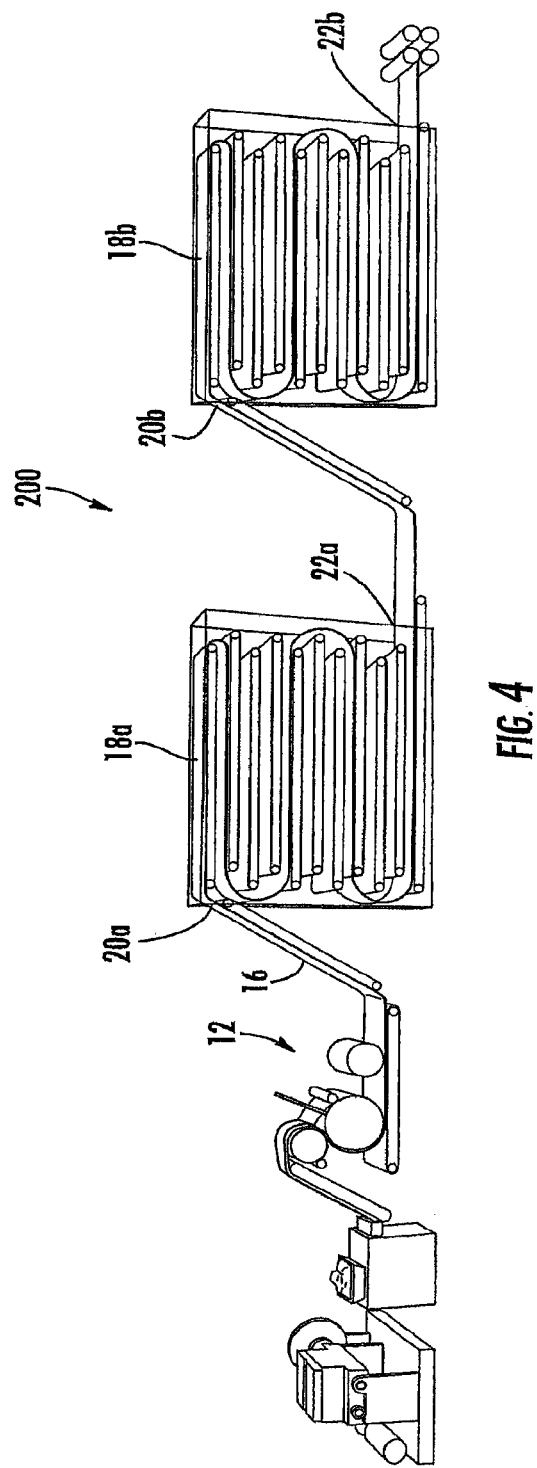
FIG. 4 is a schematic and perspective illustration of a system for forming and cooling gum according to still another exemplary embodiment.

Referring now to the exemplary embodiment of FIG. 2, cooling of the gum may also occur via cooling housing 50 and multi-pass conveying system 52 as shown. It should be appreciated that the description and discussion above for the forming apparatus 12 and overall system 10 (including the conductive and convective cooling in the cooling housing) are also applicable in the below described embodiments as shown in FIGS. 2-4.

As shown in FIG. 2, the gum slab 16 is scored and cut into desirably shaped and sized gum sheets 54 via scoring rollers 38 and cutting rollers 40 disposed along or midstream of a flow path of the multi-pass conveying system 52 (as opposed to downstream of the exit point 22 thereof as shown in FIG. 1). Similarly to FIG. 1, in this exemplary embodiment of FIG. 2 the gum slab 16 enters the cooling housing at entry point 20, and is disposed on conveyor belt 36*a*. Belt 36*a* then transports the gum slab 16 from the entry point 20 to an end of belt 36*a* disposed opposite of the entry point 20. Upon reaching the end of the belt 36*a*, the gum slab 16 falls to belt 36*b*, which is moving in an opposite direction of belt 36*a*. The gum slab 16 is then transported in an opposite end of belt 36*b*, and falls to belt 36*c*, which is moving in an opposite direction of belt 36*b*. It is at belt 36*c* where a substantial difference between the exemplary embodiments of FIGS. 1 and 2 is shown.

As shown in FIG. 2, belt 36*c* transports the gum slab to a mid-stream opening 56 in the housing 50. Though this opening 56 is shown in FIG. 3 to be disposed at level of belts 36*c* and 36*d*, it should be appreciated that the opening 56 may be disposed at either side of the housing 18 and at any desirable level of any of the belts 36*a-k* via the openings and doors discussed with reference to FIG. 1 above. These mid-stream openings, such as opening 56 allow the flow path of the multi-pass conveying system 52 to extend to a scoring and cutting area 58 disposed outside of the housing 50. In the exemplary embodiment of FIG. 2, the gum slab 16 travels away from the housing on a downwardly angled conveyor belt (not shown) to a horizontal conveyor belt (not shown) extending below and beyond an extent of the angled belt, in plane with a gap between the scoring and cutting rollers 38, 40. This horizontal belt, which runs back towards the housing 18, then transports that slab 16 to the scoring and cutting rollers 38, 40, which pull the slab 16 through the gap therebetween. The scoring and cutting rollers 38, 40 score and cut the slab 16 into gum sheets 54, and deposit the gum sheets 54 onto return belt 60. The return belt 60 is illustrated on an upward angle, so as to compensate for the downwardly vertical distance the slab 16 traveled on the downwardly angled belt (which may travel down to almost floor level in order to reach the horizontal belt). In this embodiment, the return belt 60 then returns the scored gum sheets 54 to the multi-pass conveying system 52 and cooling housing 50 by transporting the gum sheets 54 to belt 36*d*.

In another embodiment however, the belt 36*c* may extend from the mid-stream opening 56 to a point above the scoring and cutting rollers 38, 40. In such an embodiment, the slab 16 may turn downwards towards the rollers 38, 40 around the belt 36*c* in a manner similar to the slab turn shown at belt 36*a*. In this manner, the extended belt 36*c* would support the gum slab 16 while in a pre-turn portion of the scoring and cutting area 58.

It yet another embodiment, the scoring and cutting may occur at an end of extended belt 36*c* or separate belt outside of the housing 18 supporting the slab 16 (i.e. in a relatively upper portion of the scoring and cutting area 58). The scored and cut gum sheets 54 in such an embodiment may then drop to an extended belt 36*d* or return belt 60 that may be inclined on a plane more parallel to belts 36*c* and 36*d*, and extend beyond an extent of belt 36*c*. However, regardless of the equipment configurations by which the slab 16 is scored and cut into gum sheets 54, it is important to note that the scoring and cutting simply takes place within the flow path of the multi-pass conveying system 52.

It should be appreciated that the scoring in the above discussed embodiments results in pellet shaped scores in the gum sheet 54. This scoring should occur at or above a temperature of 35° C.

Once the gum sheets 54 are back within the housing 18 on belt 36*d*, they are transported to an opposite end thereof, and fall to belt 36*e*, which runs in a direction opposite of belt 36*d*. In this manner, the gum sheets 54 may then cascade down the reaming belts 36*f*-36*k* of the conveying system 52, assisted, as discussed above, by the horizontal staggering or offset of the belts. Guide shields may also be used to ensure that the gum sheets 54 fall from a belt to the belt vertically adjacent (i.e. immediately below) thereto. Similarly to the discussions of FIG. 1, the gum sheets 54 are cooled during their multi-pass residence time via convective and conductive cooling from a temperature at or above 40° C. upon entry at the entry point 20 to a temperature at or below 25° C. upon exit at the exit point 22. In a further exemplary embodiment, the gum sheets 54 cooled to 10-20° C., and more specifically 15° C. at the exit point 22. The gum sheets 54 are thereby cooled to a point where they are in condition for stacking.

It should be noted however, that as the gum sheets 54 cool within the housing 18, the sheets may break into pellets along the pellet shaped scores created by the scoring roller 38. The cooling of the gum sheets 54 along with falls from one belt to another in the housing 18 will facilitate this breaking if it is to occur. In this manner, either the gum sheets 54 or the pellets that the sheets break into will be collected in condition for stacking (i.e. not sticking) in bin 62 (where gum sheets 54 may also break into pellets). However, due to full or partial sheet breakage into pellets, the accumulation of gum in the bin 62 will be more irregular collecting than that which might be considered "stacking." In any event, the collected or stacked gum will have been cooled to a point that the sheets or pellets will not stick to each other after leaving the cooling housing 18.

Referring now to FIG. 3, it should be appreciated that the cooling housing 18 and conveying system 21 of FIG. 1 may be replaced with a cooling roller system 100 including a series of cooling rollers 102a-c configured to continuously receive the gum slab 16 from the forming apparatus 12. This system 100 may include any number of rollers necessary to cool the gum slab 16 from a temperature at or above 40° C. upon contact with the first roller 102a to a temperature at or below 25° C. (more specifically 0-20° C., 10-20° C., or 15° C.) upon release from the last roller in the series (roller 102c in FIG. 3). In an exemplary embodiment, such cooling of the gum surface may also be enhanced via addition of cooled air impinging against the outer gum surface, with the cooled air being supplied by slot fans or other kinds of fans. Via a system including these rollers 102a-c (such as system 100), the slab 16 may be cooled to a point where it is in condition for stacking.

Referring to FIG. 4, cooling of the gum slab or pellets to a point where the slab or pellets are in a condition for stacking may also take place in a cooling unit 200. As shown in FIG. 4, the cooling unit 200 includes two or more cooling housings 18a and 18b (each housing being substantially the same in structure and cooling methods and capabilities as that shown in FIG. 1) disposed in line with each other such that the gum slab flows continuously therebetween. Housing 18a continuously receives the gum slab 16 from the forming apparatus 12, and the slab 16 is continuously transported to exit point 22b of housing 18b. The unit 200 cools the gum slab 16 from a temperature at or above 40° C. upon entry at the entry point 20a to a temperature at or below 25° C. upon exit at the exit point 22b. In a further exemplary embodiment, the gum slab is cooled to 10-20° C., and more specifically 15° C. at the exit point 22b. It should be appreciated that scoring and cutting rollers 38 and 40 may also be disposed between the housings 18a and 18b, with slab being transported through housing 18a and pellets being transported through housing 18b. In addition housings 18a or 18b may be replaced with housing 50 of FIG. 2, a more conventional housing including a single pass, different airflow mechanisms, and/or different temperature ranges as desired.

As shown in the exemplary embodiment of FIG. 4, the area of the conveyor between the housings 18a and 18b may also be absent any gum processing equipment beyond merely transporting equipment such as the conveyor as shown. However, this area of the conveyor may optionally include processing equipment such as but not limited to gum drying equipment, a particulate adding equipment, printing equipment, spraying equipment, and rollers configured to at least one form, smooth, cut, and score.

It should be noted that a relatively limited change in average gum thickness is caused by exemplary embodiments of the above discussed cooling housings and the above discussed cooling roller system. In fact, exemplary embodiments of the above housings and above roller system will create a thickness variation in the gum slab 16 of less than 1% between entry and exit of the housings and system. In the system 10 of FIG. 1, such an exit is located at exit 22, while the exit in the system 10 of FIG. 2 may be opening 56 or exit 22, the exit in the system 200 of FIG. 4 may be exit 22a or 22b, and the exit in FIG. 3 is the area immediately downstream of the last roller 102c.

It should be noted that though the above discussed forming apparatus 12 was described with reference to the exemplary embodiment shown in FIGS. 1 and 2, the forming/sizing rollers 26 and 28 may be replaced with any form of moving walls (such as but not limited to a roller and a conveyor belt) configured to size the gum mass 15 into a slab 16 including a desirable thickness, such as a substantially uniform thickness between about 0.3 mm to 10 mm. In addition, the forming apparatus 12 of FIGS. 1 and 2 may be replaced with extruder(s) and sizing rollers from a traditional rolling and scoring system. The forming system 12 may also include multiple forming apparatuses disposed in a series, such as that disclosed in U.S. Application No. 61/451,805, the teachings and disclosures of which being hereby incorporated by reference in their entireties to the extent not inconsistent with the present disclosure.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A system for forming and cooling gum, the system comprising:
 a forming system configured to size the gum;
 a cooling device that is disposed in-line with said forming system and configured to continuously receive the gum from said forming system at an entry point of said cooling device;
 a multi-pass conveying system configured to continuously transport the gum from said entry point to an exit point of said cooling device, said forming system and said cooling device being configured to form and cool the gum to be in a condition for stacking or collecting upon exiting said exit point of said cooling device;
 wherein said multi-pass conveying system further includes multiple vertically displaced conveyor belts;
 wherein each belt of said multiple vertically displaced conveyor belts is horizontally offset with respect to a vertically adjacent belts, so that when said gum reaches an end of a belt, said gum falls to a horizontally offset belt.

2. The system of claim 1, wherein the gum is in said condition for stacking or collecting when said gum has been formed into desirably sized slabs, sheets, or pieces, wherein said slabs, sheets, or pieces are sufficiently cooled for non-stick stacking when said slabs, sheets, or pieces are stacked or collected in direct contact with each other.

3. The system of claim 1, wherein the gum is provided to said forming system as a gum mass, said forming system being configured to size the gum mass into desirably sized slab upstream of the cooling device.

4. The system of claim 3, wherein the system includes scoring and cutting devices configured to cut the slab in sheets including longitudinal scores, said scoring device and said cutting device being disposed downstream of said exit point of said cooling device.

5. The system of claim 3, wherein the system includes scoring and cutting devices configured to cut the slab in sheets including pellet shaped scores.

6. The system of claim 3, wherein the system includes scoring and cutting devices configured to cut the slab in sheets said scoring device and said cutting device being disposed along a flow path of said multi-pass conveying system.

7. The system of claim 6, wherein said flow path of said multi-pass conveying system exits and re-enters said cooling device at a scoring and cutting area of said flow path, said scoring device and said cutting device being disposed at said scoring area.

8. The system of claim 1, wherein said cooling device and said multi-pass conveying apparatus are configured to cool the gum from a temperature at or above 40° C. to a temperature at or below 25° C.

9. The system of claim 1, wherein said cooling device and said multi-pass conveying apparatus are configured to impart convective and conductive cooling to the gum.

10. The system of claim 1, wherein a gum mixing device is disposed upstream of and in-line with said forming system and said cooling device, and wherein a packaging device is disposed downstream of and in-line with said forming system and said cooling device.

11. The system of claim 1, wherein guide shields are disposed between vertically adjacent belts of said multiple vertically displaced conveyor belts, so as to guide said gum towards any lower belt, including vertically non-adjacent belts.

* * * * *